US009085736B2

(12) United States Patent
Morrison et al.

(10) Patent No.: US 9,085,736 B2
(45) Date of Patent: Jul. 21, 2015

(54) SYSTEM AND METHOD FOR ON STREAM CATALYST REPLACEMENT

(75) Inventors: Scott G. Morrison, Kingwood, TX (US); Tin-Tack Peter Cheung, Kingwood, TX (US); Joe Bergmeister, III, Kingwood, TX (US); Vincent D. McGahee, Kemah, TX (US); Bruce D. Murray, Kingwood, TX (US); Daniel M. Hasenberg, Kingwood, TX (US)

(73) Assignee: CHEVRON PHILLIPS CHEMICAL COMPANY LP, The Woodlands, TX (US)

( * ) Notice: Subject to any disclaimer, the term of this patent is extended or adjusted under 35 U.S.C. 154(b) by 456 days.

(21) Appl. No.: 13/282,066

(22) Filed: Oct. 26, 2011

(65) Prior Publication Data

US 2013/0109897 A1    May 2, 2013

(51) Int. Cl.
*C10G 59/02* (2006.01)
*C10G 35/04* (2006.01)

(52) U.S. Cl.
CPC .......... *C10G 35/04* (2013.01); *C10G 2300/701* (2013.01); *C10G 2400/30* (2013.01)

(58) Field of Classification Search
CPC ........ C10G 35/00; C10G 35/04; C10G 35/06; C10G 35/065; C10G 35/095; C10G 35/085; C10G 35/24; C10G 35/35; C10G 59/00; C10G 59/02
USPC .............. 208/133, 134, 63–66; 585/412, 424, 585/441
See application file for complete search history.

(56) References Cited

U.S. PATENT DOCUMENTS

| 2,773,014 A | 12/1956 | Snuggs et al. |
| 2,863,822 A | 12/1958 | Sage |
| 2,880,161 A | 3/1959 | Moore et al. |
| 2,944,000 A * | 7/1960 | Ginter ............................ 208/65 |

(Continued)

FOREIGN PATENT DOCUMENTS

| EP | 0007219 A1 | 1/1980 |
| EP | 0316727 A1 | 5/1989 |

OTHER PUBLICATIONS

Foreign communication from a related counterpart application—International Search Report and Written Opinion, PCT/US2012/056306 dated Nov. 29, 2012, 8 pages.

*Primary Examiner* — Michelle Stein
(74) *Attorney, Agent, or Firm* — Conley Rose, P.C.; Rodney B. Carroll; Monte R. Rhodes

(57) ABSTRACT

A process for operating a reforming reactor system comprising operating a plurality of reactors until at least one reactor is deemed to have an operational issue, wherein each of the plurality of reactors contains a catalyst capable of converting at least a portion of a hydrocarbon stream to aromatic hydrocarbons, isolating the at least one reactor deemed to have the operational issue from a remaining plurality of reactors that continue to operate to convert at least the portion of the hydrocarbon stream to aromatic hydrocarbons while the at least one reactor deemed to have the operational issue is isolated from the plurality of remaining reactors, addressing the operational issues, returning the at least one reactor to the hydrocarbon stream by connecting the reactor to the remaining plurality of reactors, and resuming operations of the reforming reactor system to convert at least the portion of the hydrocarbon stream to aromatic hydrocarbons.

30 Claims, 6 Drawing Sheets

(56) References Cited

U.S. PATENT DOCUMENTS

| | | | | |
|---|---|---|---|---|
| 3,154,481 | A | 10/1964 | Brooks | |
| 4,028,430 | A | 6/1977 | Stine et al. | |
| 4,072,729 | A | 2/1978 | Stine et al. | |
| 4,125,454 | A * | 11/1978 | Clem et al. | 208/65 |
| 4,166,024 | A | 8/1979 | Swan | |
| 4,191,633 | A | 3/1980 | Dauber | |
| 4,208,397 | A * | 6/1980 | Coates | 208/65 |
| 4,348,271 | A | 9/1982 | Swan | |
| 4,415,435 | A | 11/1983 | Lewis | |
| 4,425,222 | A | 1/1984 | Swan | |
| 4,810,683 | A | 3/1989 | Cohn et al. | |
| 4,830,732 | A * | 5/1989 | Mohr et al. | 208/138 |
| 4,851,380 | A | 7/1989 | Van Leirsburg et al. | |
| 4,855,269 | A | 8/1989 | Mohr | |
| 4,882,040 | A | 11/1989 | Dessau et al. | |
| 4,925,819 | A | 5/1990 | Fung et al. | |
| 4,937,215 | A | 6/1990 | Murakawa et al. | |
| 4,954,245 | A | 9/1990 | Miller et al. | |
| 5,066,628 | A | 11/1991 | Miller et al. | |
| 5,106,798 | A | 4/1992 | Fung | |
| 5,155,075 | A | 10/1992 | Innes et al. | |
| RE34,250 | E | 5/1993 | Van Leirsburg et al. | |
| 5,260,238 | A | 11/1993 | Murakawa et al. | |
| 5,391,292 | A | 2/1995 | Schorfheide et al. | |
| 5,520,798 | A | 5/1996 | Innes | |
| 5,601,698 | A | 2/1997 | Innes | |
| 5,676,821 | A | 10/1997 | Heyse et al. | |
| 5,776,849 | A | 7/1998 | Fung et al. | |
| 5,858,205 | A | 1/1999 | Huebner | |
| 5,885,439 | A | 3/1999 | Glover | |
| 5,965,473 | A | 10/1999 | Sechrist et al. | |
| 6,380,119 | B1 | 4/2002 | Grosch et al. | |
| 6,551,660 | B2 | 4/2003 | Holtermann et al. | |
| 6,710,002 | B2 | 3/2004 | Grosch et al. | |
| 6,784,132 | B1 | 8/2004 | Sechrist | |
| 6,790,802 | B1 | 9/2004 | Sechrist | |
| 6,803,029 | B2 | 10/2004 | Dieckmann | |
| 6,812,180 | B2 | 11/2004 | Fukunaga | |
| 6,881,391 | B1 | 4/2005 | Sechrist | |
| 6,974,842 | B1 * | 12/2005 | Spena et al. | 518/700 |
| 7,153,801 | B2 | 12/2006 | Wu | |
| 7,223,710 | B1 | 5/2007 | Sechrist | |
| 7,312,173 | B1 | 12/2007 | Yuan et al. | |
| 7,638,664 | B2 | 12/2009 | Peters et al. | |
| 7,868,217 | B2 | 1/2011 | Brown et al. | |
| 2005/0203328 | A1 * | 9/2005 | Glova et al. | 588/321 |
| 2010/0160147 | A1 | 6/2010 | Wu | |

* cited by examiner

SYSTEM AND METHOD FOR ON STREAM CATALYST REPLACEMENT

CROSS-REFERENCE TO RELATED APPLICATIONS

None.

FIELD OF THE INVENTION

This disclosure relates generally to a system and method for continually operating a reforming process. More particularly, the disclosure relates to continually operating a reforming process while restoring the ability of a catalyst to carry out a reforming reaction.

BACKGROUND OF THE INVENTION

Typical reforming processes can be carried out using a variety of reactors containing reforming catalysts. The reforming process encompasses a number of reactions, which are typically carried out in the presence of a catalyst, such as dehydrocyclization, hydrodecyclization, isomerization, hydrogenation, dehydrogenation, hydrocracking, cracking, etc. Reforming reactions are intended to convert paraffins, naphthenes, and olefins to aromatics and hydrogen. A variety of catalysts are used to carry out the reforming reaction, all of which are subject to deactivation over time. For example, catalyst deactivation can result from poisoning, carbon deposit formation, or other similar processes. The reforming process can include a variety of process units to remove catalyst poisons. For example, a reforming process can include a removal system to remove sulfur from the hydrocarbon stream to the reactors. By removing the sulfur from the hydrocarbon prior to contacting the hydrocarbon with the catalyst, the catalyst life can be extended.

Upon the eventual deactivation of the catalyst, the catalyst is removed from a reactor and replaced with fresh catalyst. The catalyst replacement process results in a complete reforming process shutdown during the replacement period. This period can be extensive (e.g., thirty to sixty days) due to the time necessary to physically replace the catalyst followed by any additional time necessary to pre-treat the catalyst in-situ. The catalyst replacement cost can also be a major economic driver for the reforming process. A complete reforming process shutdown can also be required for mandatory inspections of equipment and safety systems. As a result, operators of reforming processes have sought to extend the useful life of the reforming catalysts, limit the loss of production associated with shutdowns and allow for operational flexibility.

SUMMARY OF THE INVENTION

Disclosed herein is a process for operating a reforming reactor system comprising operating a plurality of reactors until at least one reactor is deemed to have an operational issue, wherein each of the plurality of reactors contains a catalyst capable of converting at least a portion of a hydrocarbon stream to aromatic hydrocarbons, isolating the at least one reactor deemed to have the operational issue from a remaining plurality of reactors that continue to operate to convert at least the portion of the hydrocarbon stream to aromatic hydrocarbons while the at least one reactor deemed to have the operational issue is isolated from the plurality of remaining reactors, addressing the operational issues, returning the at least one reactor to the hydrocarbon stream by connecting the reactor to the remaining plurality of reactors, and resuming operations of the reforming reactor system to convert at least the portion of the hydrocarbon stream to aromatic hydrocarbons.

Also disclosed herein is a system comprising a plurality of reactor-furnace pairs coupled by flow lines, wherein each reactor-furnace pair comprises a furnace coupled to a reactor, wherein each reactor comprises a reforming catalyst, a feed header coupled to the plurality of reactor-furnace pairs by a plurality of feed lines, an effluent header coupled to the plurality of reactor-furnace pairs by a plurality of effluent lines, and a plurality of valves disposed in the flow lines, the feed lines, and the effluent lines, wherein the valves are capable of being dynamically operated to create a serial flow path through the plurality of reactor-furnace pairs.

Further disclosed herein is a method comprising operating a reforming reactor system comprising a plurality of reactors connected in a first order until a first reactor of the plurality of reactors is deemed to contain a spent catalyst, wherein each of the plurality of reactors contains a catalyst comprising a zeolite capable of converting at least a portion of a hydrocarbon stream to aromatic hydrocarbons, isolating the first reactor containing the spent catalyst from the remaining reactors, wherein the remaining reactors continue to operate to convert at least the portion of the hydrocarbon stream to aromatic hydrocarbons when the first reactor is isolated from the remaining reactors, restoring the ability of the first reactor containing the spent catalyst to convert at least a portion of the hydrocarbon stream to aromatic hydrocarbons, returning the first reactor to the hydrocarbon stream to connect the plurality of reactors in a second order, resuming operations of the reforming reactor system until a second reactor of the plurality of reactors is deemed to contain a spent catalyst, isolating the second reactor containing the spent catalyst from the remaining reactors, wherein the remaining reactors continue to operate to convert at least the portion of the hydrocarbon stream to aromatic hydrocarbons when the second reactor is isolated from the remaining reactors, restoring the ability of the second reactor containing the spent catalyst to convert at least a portion of the hydrocarbon stream to aromatic hydrocarbons, and returning the second reactor to the hydrocarbon stream to connect the plurality of reactors in a third order.

DETAILED DESCRIPTION OF EMBODIMENTS

Figure 1:
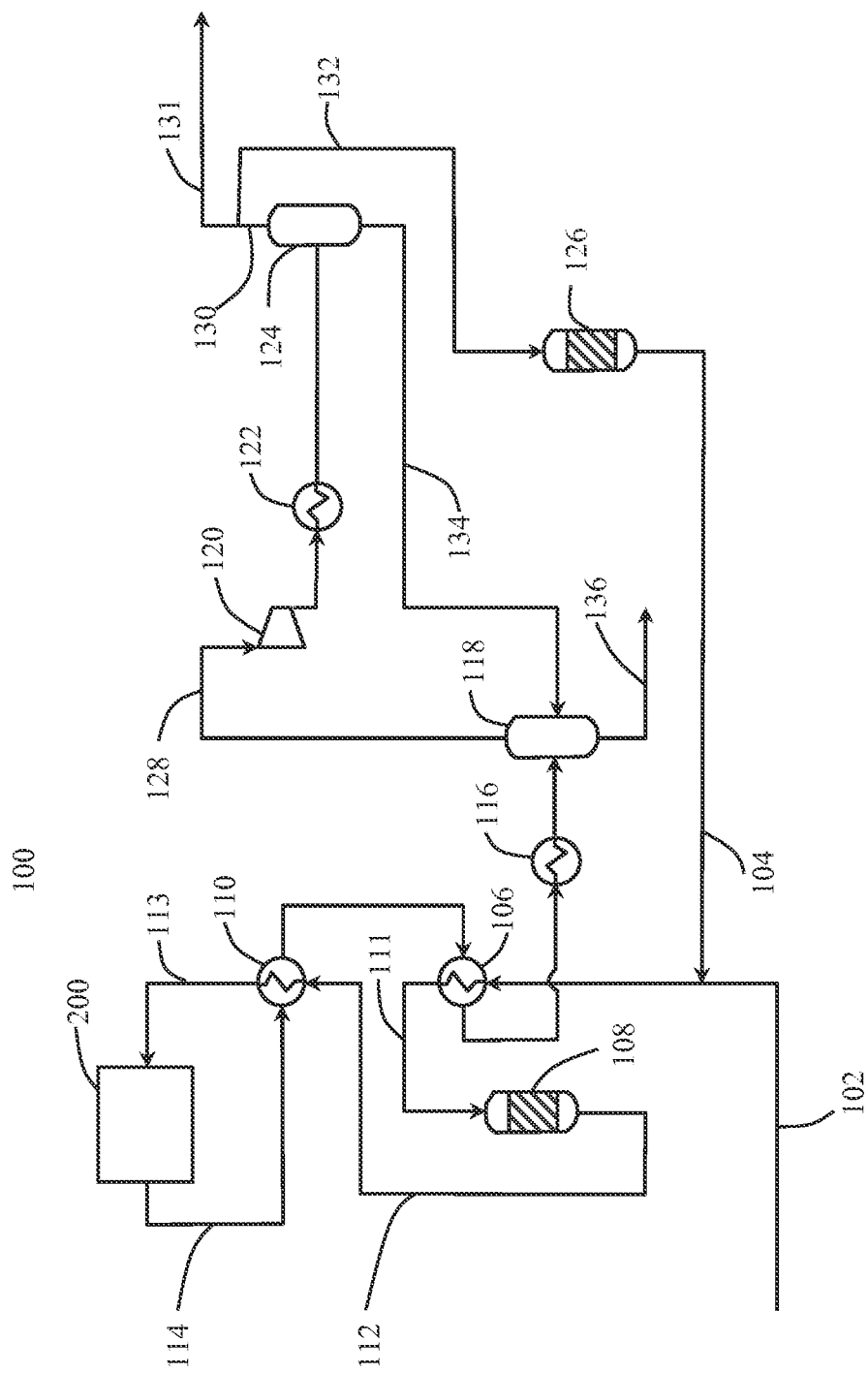
FIG. 1 is a flow diagram of an embodiment of a reforming process of the disclosure.

As is generally understood, a reforming "reaction", typically takes place within a reforming "reactor." As used herein, the terms "restore" and "restoring" may be used to refer to regeneration of a catalyst, rejuvenation of a catalyst, and/or replacement of a catalyst with fresh catalyst. The terms "restore" and "restoring" may also be used to refer to the inspection of reactors, reactor internals, or reactor safety devices. The reactor employed in this processes described herein may be any conventional type of reactor that maintains a catalyst within the reactor and can accommodate a continuous flow of hydrocarbon. The catalytic reactor system described herein may comprise a fixed catalyst bed system, a moving catalyst bed system, a fluidized catalyst bed system, or combinations thereof. Suitable reactors may include, but are not limited to, fixed bed reactors including radial flow reactors, bubble bed reactors, or ebullient bed reactors. The flow of the feed can be upward, downward, or radially through the reactor. In various embodiments, the catalytic reactor system described herein may be operated as an adiabatic catalytic reactor system or an isothermal catalytic reactor system. As used herein, a "hydrocarbon stream" comprises hydrocarbons, though components other than molecules comprising hydrogen and carbon may be present in the stream (e.g., hydrogen gas). In some embodiments, a "hydrocarbon" may comprise individual molecules that comprise one or more atoms other than hydrogen and carbon (e.g., nitrogen, oxygen, etc.).

Disclosed herein are systems, apparatuses, and methods related to carrying out a continuous reforming process while allowing for the restoration of the reactors and catalysts used in the reforming process. In an embodiment, a series of reactors are used to carry out a reforming reaction until the catalyst in at least one of the reactors is deemed to be spent. The reactor containing the spent catalyst is then isolated from the remaining reactors while the catalyst is restored. For example, the catalyst could be regenerated and/or rejuvenated before the reactor is removed from isolation and placed back into the series of reactors. In another embodiment, the spent catalyst could be physically removed and replaced with a fresh catalyst, ex-situ regenerated catalyst, and/or rejuvenated catalyst. Once the catalyst has been restored, the reactor is removed from isolation and placed back into the series of reactors and the reforming process is continued. In another embodiment, the reactor may be inspected and/or serviced. In another embodiment, safety systems may be inspected and/or serviced. The ability to restore the catalyst without shutting down the process may allow the process to operate continuously.

In some embodiments, the reactor with the restored catalyst can be placed back into the series of reactors in a different order than the reactor was taken out of the series of reactors. For example, the first reactor (i.e., at or closest to the entrance of the fresh hydrocarbon feed) may be isolated and restored before being placed back into the series of reactors as the last reactor in the series (i.e., furthest from the entrance of the fresh hydrocarbon feed). The ability to reorder the reactors may be beneficial since the last reactor in the series of reforming reactors generally receives a feed stream, which in an embodiment may comprise a hydrocarbon stream, having the lowest concentration of convertible hydrocarbons of any hydrocarbon stream fed to each reactor in the series. A high catalyst activity relative to each reactor in the series may allow the last reactor to improve the conversion efficiency of the overall reactor series when contacted with hydrocarbon having the lowest concentration of convertible hydrocarbons. Further, reordering the reactors may allow the reactor with a catalyst having the lowest activity to be placed at the beginning of the series of reactors (i.e., closest to the entrance of the hydrocarbon). The low activity catalyst in the first reactor in the series can then be used as a sacrificial absorber to protect the catalyst in the remainder of the reactors in series. This process may allow for the elimination of a separate sulfur removal system, thus simplifying the process and saving the capital and operating costs associated with the operation of a sulfur removal system. The reordering of the reactors may further allow for various other conditions within the reforming process to be adjusted relative to a process without the ability to restore the catalyst in a continuous process. These and other benefits will be described in more detail below.

A general reforming process 100 is shown in FIG. 1. At the inlet of the process, the hydrocarbon stream is fed through line 102. Various feedstocks may be suitable for use with reforming processes and generally comprise non-aromatic hydrocarbons. The feed to the reforming system comprising an aromatization system can be a mixture of hydrocarbons comprising $C_6$ to $C_8$ hydrocarbons containing up to about 10 wt % and alternatively up to about 15 wt % of $C_5$ and lighter hydrocarbons ($C_5^-$) and containing up to about 10 wt % of $C_9$ and heavier hydrocarbons ($C_9^+$). This would include streams boiling within the 70° F.-450° F. temperature range, alternatively from about 120° F. to about 400° F. In an embodiment, the hydrocarbon stream may have a sulfur content ranging from less than 200 ppbw, alternatively less than 100 ppbw, alternatively from about 10 parts per billion by weight (ppbw) to about 100 ppbw. Examples of suitable feedstocks include straight-run naphthas from petroleum refining or fractions thereof which have been hydrotreated to remove sulfur and other catalyst poisons. Also suitable are synthetic naphthas or naphtha fractions derived from other sources such as coal, natural gas, or from processes such as Fischer-Tropsch processes, fluid catalytic crackers, and hydrocrackers. While not shown in FIG. 1, various upstream hydrocarbon pretreatment steps may be used to prepare the hydrocarbon for the reforming process. For example, hydrotreating may be used to remove catalyst poisons such as sulfur. Contacting the hydrocarbon with a massive nickel catalyst, for example, prior to the reforming reaction may also protect against failure of the hydrotreating system.

The hydrocarbon stream passing through line 102 may be combined with a recycle stream 104, which may contain hydrogen, before passing to a first heat exchanger 106. After passing through the first heat exchanger 106, the hydrocarbon stream passes to the sulfur removal system 108 through line 111. The sulfur removal system 108 may be used to reduce the amount of sulfur in the hydrocarbon stream and may comprise any suitable sulfur removal system capable of removing sulfur from the hydrocarbon stream. In an embodiment, the sulfur removal system 108 may comprise one or more vessels that allow the hydrocarbon stream to pass as a fluid through a sulfur removal system comprising a sulfur converter containing, a group VIII metal and a sulfur adsorber. The sulfur removal system 108 may also act as a precaution or backup in case any upstream hydrotreating system fails or has an operating upset. After passing through the sulfur removal system 108, the hydrocarbon stream may pass through line 112 to a second heat exchanger 110 designed to further adjust the temperature of the hydrocarbon stream. The hydrocarbon stream may then pass through line 113 to the reforming reactor section 200 of reforming process 100.

Figure 2:
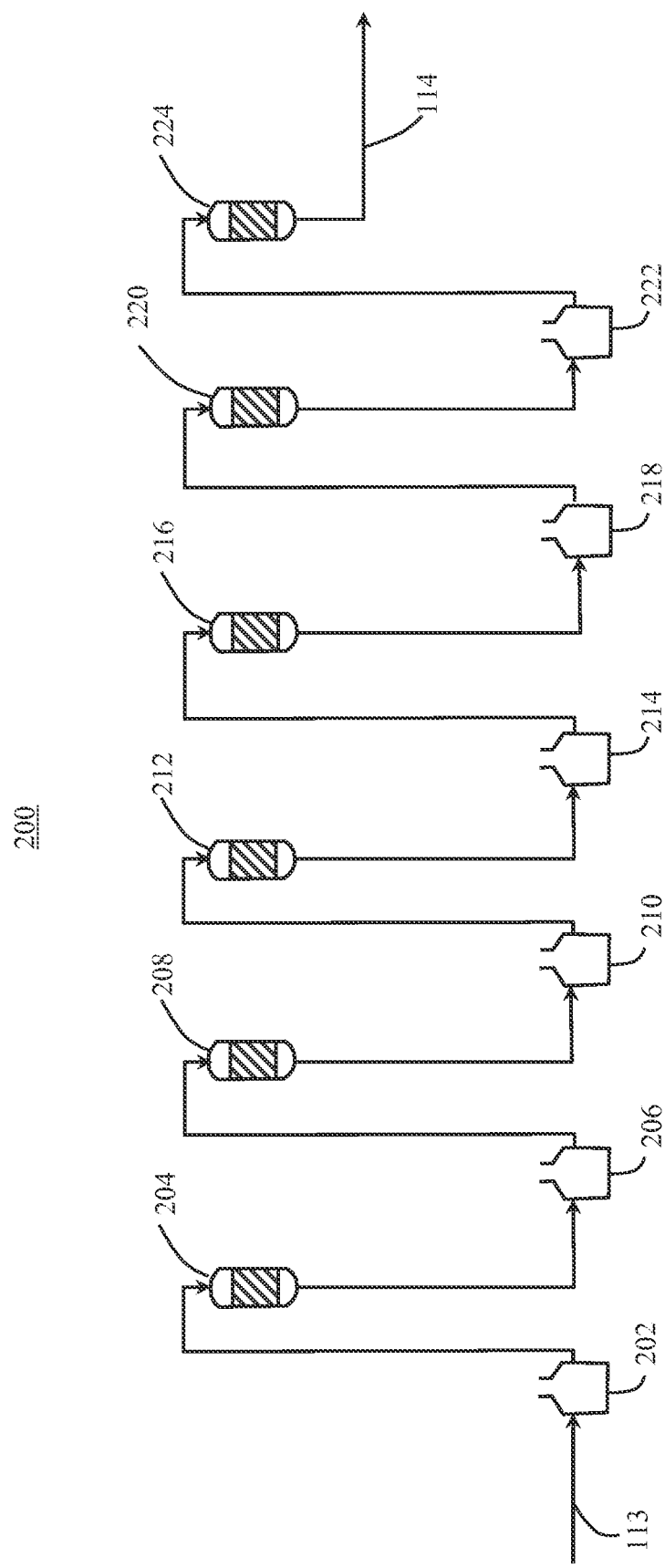
FIG. 2 is a flow diagram of an embodiment of a reactor section of the disclosure.

As shown in FIG. 2, the reforming reactor section 200 generally comprises a plurality of reactors 204, 208, 212, 216, 220, 224 arranged in series with furnaces 202, 206, 210, 214, 218, 222 located upstream of each reactor, respectively. In an embodiment, the combination of a furnace coupled to a downstream reactor may be referred to throughout the present specification as a "reactor-furnace pair." The furnaces 202, 206, 210, 214, 218, 222 may comprise any type of furnace capable of raising the temperature of the reactant stream to achieve the desired inlet temperature to the paired reactor.

The temperature may be raised so that the reforming reactions proceed in the subsequent reactors, which is generally needed due to the endothermic nature of the reforming process.

The reactor section 200 may consist of a plurality of reactor-furnace pairs. In an embodiment, the reaction zone 200 comprises three or more serially connected reactors. All of the reactors 204, 208, 212, 216, 220, 224 can be the same or different in size or configuration. In an embodiment, all of the reactors 204, 208, 212, 216, 220, 224 are radial flow reactors with the hydrocarbon stream passing through the reactors in inward or outward flow. In an embodiment, the reactors may be sized according to known techniques, and all of the reactors may be the same size. Alternatively, one or more reactors may be different sizes.

In general, the reforming reaction occurs under process conditions that thermodynamically favor the dehydrocyclization reactions and limit undesirable hydrocracking reactions. The reforming reaction can be carried out using any conventional reforming conditions, and may be carried out at reactor inlet temperatures ranging from about 600° F. to about 1100° F., alternatively from about 650° F. to about 1100° F., alternatively from about 700° F. to about 1100° F., alternatively from about 800° F. to about 1050° F., alternatively from about 850° F. to about 1050° F. Reaction pressures may range from about atmospheric pressure to about 500 psig, alternatively from about 25 psig to about 300 psig, and alternatively from about 30 psig to about 100 psig. The molar ratio of hydrogen to hydrocarbon in the reactor stream is normally between about 0.1 and about 10, alternatively from about 0.5 to about 5.0, and alternatively from about 1:1 to about 3:1. The liquid hourly space velocity (LHSV) for the hydrocarbon feed over the aromatization catalyst is from about 0.5 to about 20, and alternatively from about 0.50 to about 5.0 based on the catalyst in the reaction zone.

In an embodiment, the reactors 204, 208, 212, 216, 220, 224 each contain a catalyst for carrying out a reforming process. As is known to those of ordinary skill in the art, a suitable reforming catalyst is capable of converting at least a portion of aliphatic, alicyclic, and/or naphthenic hydrocarbons (e.g., non-aromatic hydrocarbons) in a hydrocarbon stream to aromatic hydrocarbons. Any catalyst capable of carrying out a reforming reaction may be used alone or in combination with additional catalytic materials in the reactors. Suitable catalysts may include acidic or non-acidic catalysts. In an embodiment, the catalyst is a non-acidic catalyst. A suitable non-acidic catalyst may comprise a non-acidic zeolite support, at least one group VIII metal, and one or more halides. Suitable halides include chloride, fluoride, bromide, iodide, or combinations thereof. Suitable Group VIII metals include iron, cobalt, nickel, ruthenium, rhodium, palladium, osmium, iridium, platinum, or combinations thereof. Examples of catalysts suitable for use with the catalytic reactor system described herein are AROMAX® catalysts available from the Chevron Phillips Chemical Company LP of The Woodlands, Tex., and those discussed in U.S. Pat. No. 6,812,180 to Fukunaga entitled "Method for Preparing Catalyst" and U.S. Pat. No. 7,153,801 to Wu entitled "Aromatization Catalyst and Methods of Making and Using Same," each of which is incorporated herein by reference as if reproduced in their entirety.

The supports for catalysts can generally include any inorganic oxide. These inorganic oxides may include bound large pore aluminosilicates (zeolites), amorphous inorganic oxides and mixtures thereof. Large pore aluminosilicates can include, but are not limited to, L-zeolite, Y-zeolite, mordenite, omega zeolite, beta zeolite, and the like. Amorphous inorganic oxides can include, but are not limited to, aluminum oxide, silicon oxide, and titania. Suitable bonding agents for the inorganic oxides can include, but are not limited to, silica, alumina, clays, titania, and magnesium oxide.

Zeolite materials, both natural and synthetic, are known to have catalytic properties for many hydrocarbon processes. Zeolites typically are ordered porous crystalline aluminosilicates having structure with cavities and channels interconnected by channels. The cavities and channels throughout the crystalline material generally can be of a size to allow selective separation of hydrocarbons.

The term "zeolite" generally refers to a particular group of hydrated, crystalline metal aluminosilicates. These zeolites exhibit a network of $SiO_4$ and $AlO_4$ tetrahedra in which aluminum and silicon atoms are crosslinked in a three-dimensional framework by sharing oxygen atoms. In the framework, the ratio of oxygen atoms to the total of aluminum and silicon atoms may be equal to about 2. The framework exhibits a negative electrovalence that typically is balanced by the inclusion of cations within the crystal such as metals, alkali metals, alkaline earth metals, or hydrogen.

L-type zeolite catalysts are a sub-group of zeolitic catalysts. Typical L-type zeolites contain mole ratios of oxides in accordance with the following formula:

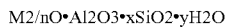

$$M_{2/n}O \cdot Al_2O_3 \cdot xSiO_2 \cdot yH_2O$$

wherein "M" designates at least one exchangeable cation such as barium, calcium, cerium, lithium, magnesium, potassium, sodium, strontium, and zinc as well as non-metallic cations like hydronium and ammonium ions which may be replaced by other exchangeable cations without causing a substantial alteration of the basic crystal structure of the L-type zeolite. The "n" in the formula represents the valence of "M", "x" is 2 or greater; and "y" is the number of water molecules contained in the channels or interconnected voids with the zeolite. Bound potassium L-type zeolites, or KL zeolites, have been found to be particularly desirable. The term "KL zeolite" as used herein refers to L-type zeolites in which the principal cation M incorporated in the zeolite is potassium. A KL zeolite may be cation-exchanged or impregnated with another metal and one or more halides to produce a platinum-impregnated, halided zeolite or a KL supported Pt-halide zeolite catalyst.

In an embodiment, the at least one Group VIII metal is platinum. In another embodiment, the at least one Group VIII metal is platinum and gold. In an embodiment, the at least one Group VIII metal is platinum and rhenium. The platinum and optionally one or more halides may be added to the zeolite support by any suitable method, for example via impregnation with a solution of a platinum-containing compound and one or more halide-containing compounds. For example, the platinum-containing compound can be any decomposable platinum-containing compound. Examples of such compounds include, but are not limited to, ammonium tetrachloroplatinate, chloroplatinic acid, diammineplatinum (II) nitrite, bis-(ethylenediamine)platinum (II) chloride, platinum (II) acetylacetonate, dichlorodiammine platinum, platinum (II) chloride, tetraammineplatinum (II) hydroxide, tetraammineplatinum chloride, and tetraammineplatinum (II) nitrate.

In an embodiment, the catalyst is a large pore zeolite support with a platinum-containing compound and at least one ammonium halide compound. The ammonium halide compound may comprise one or more compounds represented by the formula $N(R)_4X$, where X is a halide and where R represents a hydrogen or a substituted or unsubstituted carbon chain molecule having 1-20 carbons wherein each R may be the same or different. In an embodiment, R is selected from the group consisting of methyl, ethyl, propyl, butyl, and combinations thereof, more specifically methyl. Examples of suitable ammonium compounds are represented by the formula $N(R)_4X$ include ammonium chloride, ammonium fluoride, and tetraalkylammonium halides such as tetramethylammonium chloride, tetramethylammonium fluoride, tetraethylammonium chloride, tetraethylammonium fluoride, tetrapropylammonium chloride, tetrapropylammonium fluoride, tetrabutylammonium chloride, tetrabutylammonium fluoride, methyltriethylammonium chloride, methyltriethylammonium fluoride, and combinations thereof.

The catalyst can be employed in any of the conventional types or structures known to the art. It may be employed in the form of extrudates, pills, pellets, granules, broken fragments, or various special shapes, disposed within a reaction zone (e.g., in a fixed bed), and the charging stock may be passed therethrough in the liquid, vapor, or mixed phase, and in either upward or downward, or inward or outward flow.

In an embodiment, during the operation of the reforming reactor system at least one reactor may be deemed to have an operational issue. In an embodiment the nature of the operational issue may comprise a decrease in catalytic activity or selectivity over time. A catalyst that exhibits an unacceptably low catalytic performance compared to an initial catalytic performance can be described as a "spent" catalyst. In an embodiment the nature of the operational issue may comprise inspection and/or servicing of the reactor containing the catalyst. In another embodiment, the nature of the operational issue may comprise inspection and/or servicing of the safety systems associated with the reactor containing the catalyst. In an embodiment, the operational issue may be based on operational considerations, economic considerations, catalyst performance, or any combination thereof.

In an embodiment, the catalyst used in the reforming process may experience a decrease in catalytic activity or selectivity over time. The resulting deactivation of the catalyst can result from a number of mechanisms including, but not limited to, coking, poisoning, and/or loss of catalytic material or components. As used herein, the term "coke" refers to a carbon-rich carbonaceous material, generally having a C/H ratio >1. The term "coking" refers to the process of depositing coke on a surface. Both the term "coke" and "coking" as used herein are meant to include the conventional meaning known in the art. A catalyst that exhibits an unacceptably low catalytic performance compared to an initial catalytic performance can be described as a "spent" catalyst. In an embodiment, a catalyst can be deemed a spent catalyst when the catalytic activity is less than or equal to about 50%, alternatively about 40%, alternatively about 30%, alternatively 20%, or alternatively 10% of the initial catalytic activity of the catalyst when initially placed into service. In an embodiment, a catalyst can be deemed a spent catalyst when the catalytic selectivity as measured by methane production is more than or equal to about 150% of the catalyst when initially placed into service. In an embodiment, a catalyst may be deemed to be a spent catalyst based on catalyst performance, alone or in combination with operational considerations, and/or economic considerations. For example, the catalyst may be deemed to be spent when the income attributable to an improved conversion efficiency, and thus an increased product yield, as a result of replacing the catalyst outweighs the expense of replacing the catalyst.

As shown in FIG. 2, the hydrocarbon stream proceeds through the reactor train in a serial flow scheme. Between each reactor 204, 208, 212, 216, 220, 224, the hydrocarbon stream passes through a furnace 202, 206, 210, 214, 218, 222, respectively, to raise the temperature of the stream back to a desired reactor inlet temperature. Once heated, the stream is then returned to the next reactor until the reforming stream passes out of the final reactor in the series as the reforming effluent stream, which passes through line 114 to the downstream processing units.

Returning to FIG. 1, the reforming effluent stream passing through line 114 passes through both the second heat exchanger 110 and the first heat exchanger 106 to be cooled before passing to a trim cooler 116 for a final temperature adjustment before entering the separator 118. The separator 118 splits the reforming effluent stream into a liquid product stream 136 containing about 60% to 90% wt % aromatics in the bottoms and a net-gas stream 128. This liquid product can be further purified to collect a higher percentage of aromatics in the stream, and any unreacted products can leave the process as another product stream or be recycled to the inlet of the process. The net-gas stream 128 from the top of separator 118 may pass through a compressor 120 and a cooler 122 before passing to separator 124. The separator 124 separates the compressed and cooled net-gas stream 128 into a hydrogen rich stream 130 from any remaining $C_5^+$ products. The remaining $C_5^+$ products are recycled to separator 118 through line 134. The hydrogen rich stream is split into a hydrogen product stream 131 and a recycle hydrogen stream 132. The recycle hydrogen stream 132 then passes through a drier 126 before passing through line 104 to re-enter the process along with the hydrocarbon stream passing through line 102. The hydrogen product stream 131 may be further purified to provide hydrogen for use in an industrial process (e.g., a refinery).

The piping and equipment used through the reforming process 100 may be constructed of suitable materials based on the operating conditions of the equipment. In an embodiment, Ni and/or cobalt containing alloys may be used in the construction of the plant, including the piping and/or equipment. Suitable alloys include, but are not limited to, all alloys containing at least about 8 wt % Ni and/or Co including 300 series austenitic stainless steels (e.g., 304, 310, 316, 321, 347), Incoloy 800, Incoloy 802, heat resistant casting such as HK-40, HP-50, Manaurite XTM, and nickel base alloys such as Inconel 600, 601, 617, 625, Hastelloy C and X, Haynes 214, Nimonic 115, and Udimet 700. Even with the use of these materials, it may be desirable that the metal surfaces of the piping or equipment that contact the hydrocarbons and aromatics at elevated temperatures are made of a material or are coated with a material having a resistance to coking, carburization, and metal dusting. In an embodiment, the surface of the piping and equipment that contact hydrocarbons can be treated with a metal protective coating by a method comprising plating, cladding, painting or coating the surfaces that contact the hydrocarbon to provide improved resistance to carburization and metal dusting. Alternatively, the surfaces can be constructed of or lined with a ceramic material.

In an embodiment of the invention, the metal surfaces of the plurality of reforming reactor-furnace pairs and connecting lines have a metal-containing coating, cladding, plating, or paint applied to at least a portion (e.g., at least about 80%, alternatively at least about 95%, or alternatively about 100%) of the surface area that is to be contacted with hydrocarbons at process temperature. After coating, the metal-coated reactor system is preferably heated to produce intermetallic and/or metal carbide layers. A preferred metal-coated reactor system preferably comprises a base construction material (such as a carbon steel, a chromium steel, or a stainless steel) having one or more adherent metallic layers attached thereto. Examples of metallic layers include elemental chromium and iron-tin intermetallic compounds such as $FeSn_2$. Suitable coatings as well as application and processing techniques are described in U.S. Pat. No. 5,676,821 to Heyse, and U.S. Pat. No. 6,551,660 to Holtermann, each of which is incorporated herein by reference.

Additional materials useful for preventing coking may include alloys comprising aluminum. For example the allow may comprise at least about 1% Al and more preferably at least about 4% Al up to a maximum of about 10 wt % Al. Alternatively, the alloy may be coated with a diffusion layer of Al, where Al metal is reacted with the alloy in a high temperature process to form a surface diffusion layer rich in aluminum. The concentration of Al in the surface diffusion layer can range anywhere from 5 to roughly 30 wt % depending upon the preparation method. Suitable alloys and materials formed using aluminum and aluminum coating are described in U.S. Pat. No. 6,803,029 to Dieckmann, which is incorporated herein by reference.

Figure 3:
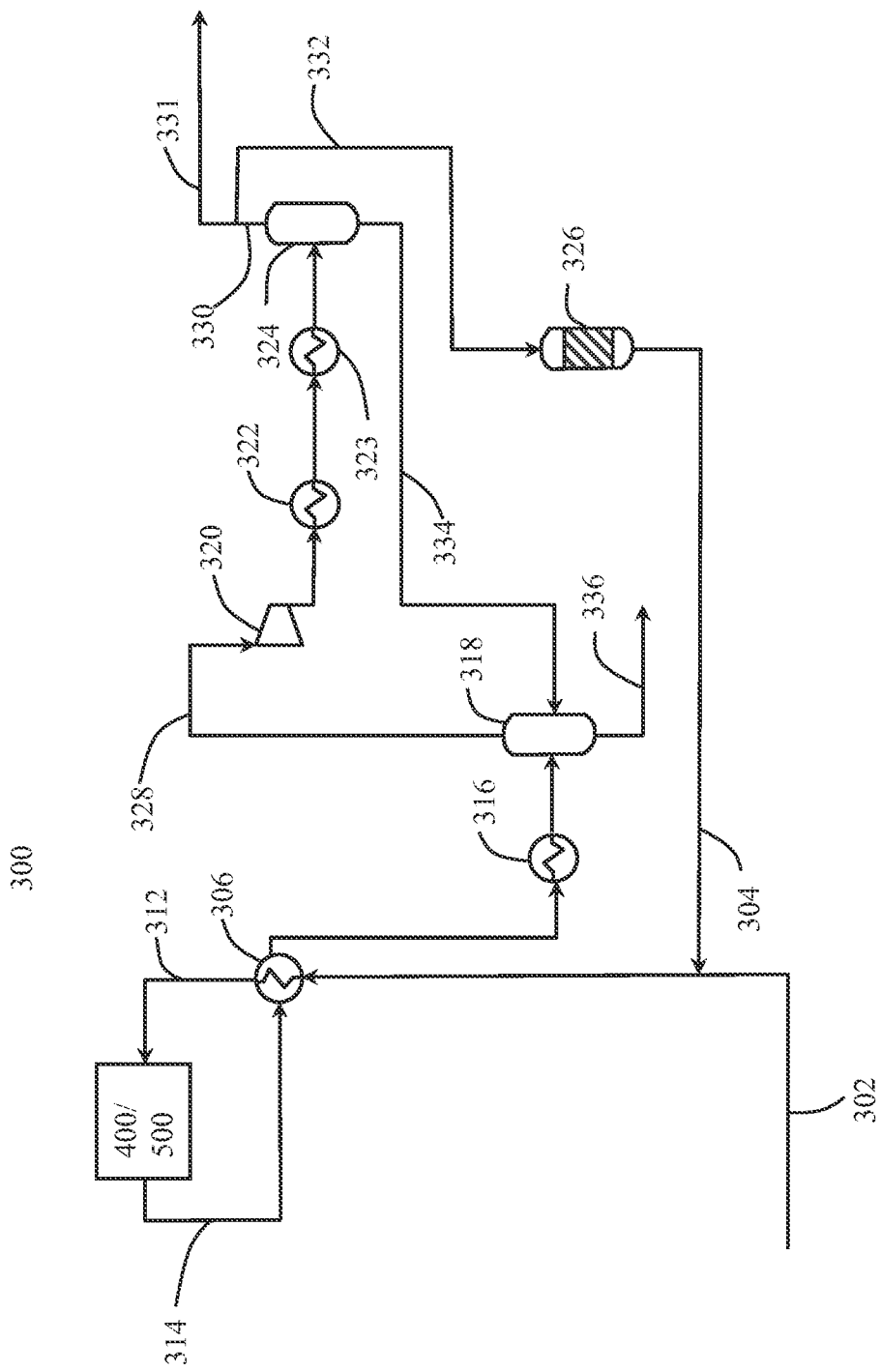
FIG. 3 is a flow diagram of another embodiment of a reforming process of the disclosure.

An embodiment of a reforming process 300 is shown in FIG. 3. In reforming process 300, the hydrocarbon stream 302 may be combined with a recycle stream 304, which may contain hydrogen for the reforming reaction, before passing to a heat exchanger 306. The hydrocarbon stream 312 may then pass to a reforming reactor section 400/500 of reforming process 300. In reforming process 300, the sulfur removal system has been eliminated due to the use of a dynamic flow scheme, as discussed in more detail below. Since reforming process 300 does not require a sulfur removal system, only one heat exchanger 306 has been included before the inlet to the reactor section. Although it is possible to have two or more heat exchangers in retrofit applications or for equipment sizing considerations.

The reforming effluent stream 314 from the reactor section may pass to the heat exchanger 306 to be cooled before passing to a trim cooler 316 for a final temperature adjustment before entering the separator 318. The separator 318 splits the reforming effluent stream into a liquid product stream 336 containing from about 70 wt % to about 90 wt % aromatics in the bottoms. This liquid product stream 336 can be further purified to collect a higher percentage aromatics stream, and any unreacted products can leave the process as another product stream or be recycled to the inlet of the process. The net-gas stream 328 from the separator 318 may pass through a compressor 320, a cooler 322, and optionally, a chiller 323 before passing to separator 324. The separator 324 separates the compressed and cooled net-gas stream 328 into a hydrogen rich stream 330 from any remaining $C_5^+$ products. The remaining $C_5^+$ products are recycled to separator 318 through line 334. The hydrogen rich stream is split into a hydrogen product stream 331 and a recycle hydrogen stream 332. The recycle hydrogen stream 332 then passes through a drier 326 to become stream 304 and join the hydrocarbon stream 302. A recycle stream 334 may pass from separator 324 to the separator 318 to further recover any liquid product.

Figure 4:
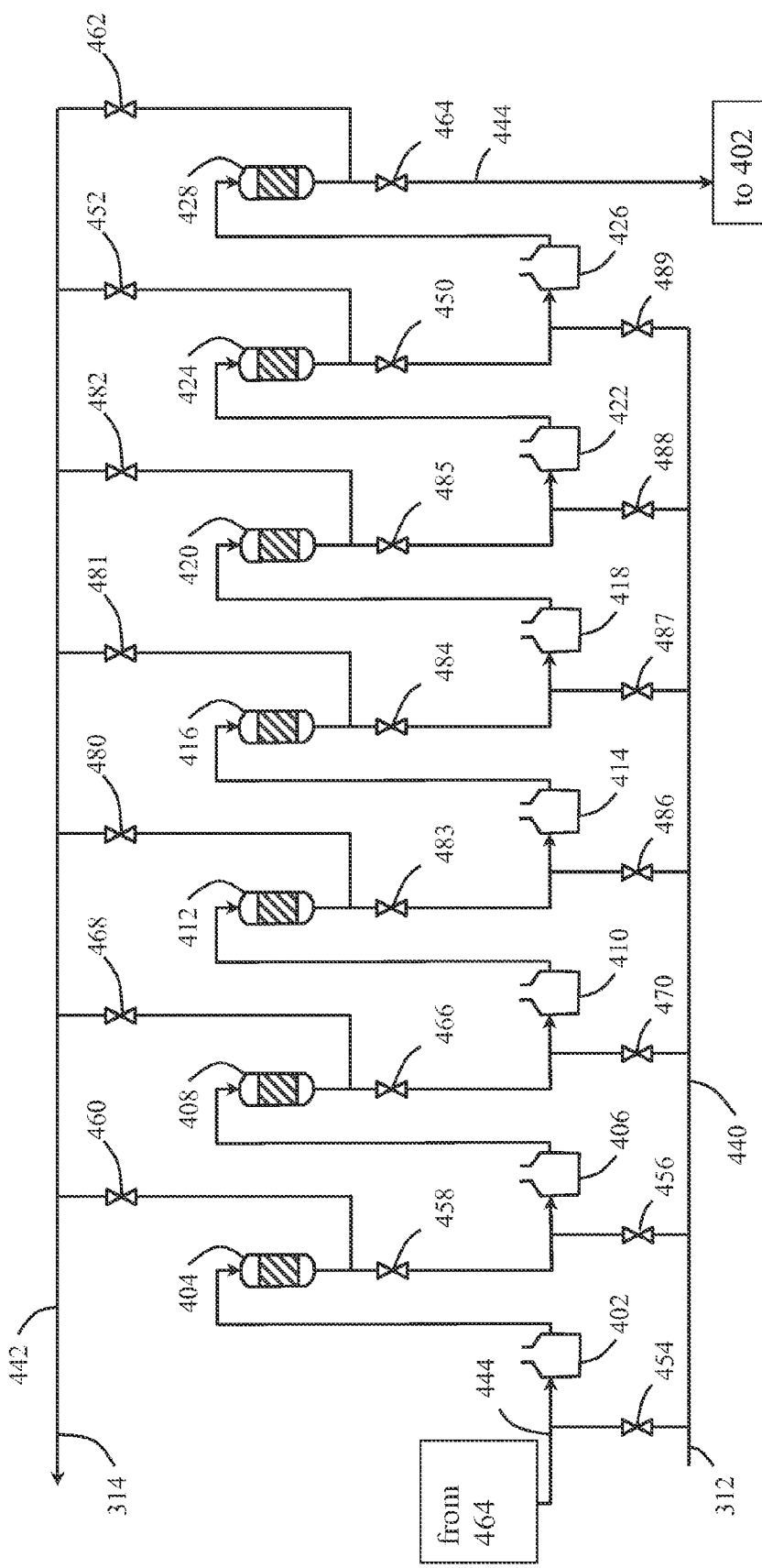
FIG. 4 is a flow diagram of another embodiment of a reactor section of the disclosure.

An embodiment of a reactor section 400 is shown in FIG. 4 in which lines are available to allow for the isolation and re-ordering of the process flow of the reactors 404, 408, 412, 416, 420, 424, 428 and furnaces 402, 406, 410, 414, 418, 422, 426 located upstream of each reactor in the reactor train. While reactor section 400 is discussed in the context of the reforming process 300, an embodiment of the reactor section 400 could also be used in place of the reactor section 200 in the reforming process 100. In this embodiment, reactor 428 is present in the reactor series as an additional reactor when compared to the reactor section 200, allowing for a total of seven reactors. While one more reactor is shown in the reactor section 400 than reactor section 200, the concepts of reactor system 400 could be applied to any plurality of reactors. In this embodiment, the reactor section 400 generally comprises a plurality of reactors 404, 408, 412, 416, 420, 424, 428 arranged in series with furnaces 402, 406, 410, 414, 418, 422, 426 located upstream of each reactor, respectively. As described above, the combination of a furnace coupled to a downstream reactor may be referred to as a "reactor-furnace pair." For example, the combination of furnace 402 coupled to reactor 404 may be referred to as a reactor-furnace pair.

As shown in FIG. 4, the additional lines in the reactor section 400 allow for a dynamic flow scheme. As used herein, the term "dynamic flow scheme" refers to the ability of the hydrocarbon flow through the reactor system to be introduced prior to the furnace of any one reactor-furnace pair and then the effluent to be removed downstream of any one downstream reactor-furnace pair. In an embodiment the downstream reactor may be chosen so as to bypass one or more reactors so that catalyst activity may be restored to the one or more reactors while also allowing the reforming process to continue to operate in the remaining reactor-furnace pairs. Accordingly, the dynamic flow scheme may allow the order of the reactors (e.g., the first reactor, the last reactor, and any reactors in between the first and last reactors) to be changed. In an embodiment as shown in FIG. 4, a dynamic flow scheme is achieved by providing a feed header 440, an effluent header 442, and a plurality of valves 450, 452, 454, 456, 458, 460, 462, 464, 466, 468, 470, 480, 481, 482, 483, 484, 485, 486, 487, 488, 489 disposed in the lines. The valves used herein may be simple valves or may represent more complex systems such as double-block and bleed valves or double-block and blind valves.

The reactor section 400 may comprise a plurality of reactors. As described above, the reaction section 400 may comprise three or more serially connected reactors with one or more additional reactors available as spare reactors or additional reactors for use in the process. The reactor and catalyst can comprise any of the reactors and catalysts as described in more detail herein. In an embodiment, the feed header 440 is provided to allow the hydrocarbon stream to be directed to the furnace of any reactor-furnace pair in the series of reactors and the effluent may be removed downstream of any one downstream reactor-furnace pair. A series of valves may be provided in the lines between the feed header 440 and the inlet to each furnace 402, 406, 410, 414, 418, 422, and 426. An effluent header 442 is provided to allow the effluent from any desired reactor to be directed to line 314 leading out of the reactor section. A series of valves may be provided in the lines between the effluent header 442 and the outlet line from each reactor 404, 408, 412, 416, 420, 424, and 428. While only a single recycle line 444 is shown in FIG. 4 for simplicity, it should be understood that any number of recycle lines may be provided between the outlet of the reactors 404, 408, 412, 416, 420, 424, 428 and the inlet of any of the furnaces 402, 406, 410, 414, 418, 422, 426. This arrangement may allow for the rearrangement of the furnaces and reactors (e.g., the reactor-furnace pairs) in any desired order. In the embodiment shown in FIG. 4, a valve 464 may be provided in flow line 444 to selectively allow flow from the reactor 428 to the furnace 402. The valves may be selectively operated in a dynamic fashion to provide a desired flow scheme using the series of reactors. As part of the dynamic flow scheme, one or more reactors in the series may be isolated to allow the catalyst within the reactors to be restored prior to being placed back into the series of reactors. Additional equipment as known in the art may also be included in the reforming process. For example, a halide removal system may be included to capture any halides evolving from the catalyst during the reforming process. In an embodiment, a halide removal system may be located between the reactor section 400 and separator 318 of FIG. 3. Additional valves, purge lines, drain lines are all within the processes described herein.

In an embodiment, a reforming process may be carried out using the reactor configuration shown in FIG. 4. The hydrocarbon stream may first pass through line 312 and initially enter the reactor section. In an embodiment, the reactors and furnaces may initially be arranged so that the hydrocarbon flows serially through the furnaces 402, 406, 410, 414, 418, 422 and reactors 404, 408, 412, 416, 420, 424, respectively. In this arrangement, all of the valves between the feed header 440 and the furnaces are closed except for valve 454, and all of the valves between the reactors and the effluent header 442 are closed except for valve 452. The valves between the reactors and furnaces are open except for valve 450. Furnace 426 and reactor 428 may be isolated from the reactor train initially and maintained as a spare reactor. Furnace 426 and reactor 428 may be isolated by closed valves 450, 464, and 462.

In an embodiment, the reforming process may not have a sulfur removal system. As a result, the first reactor in the series may be used to absorb any sulfur present in the hydrocarbon stream passing through line 312. The resulting poisoning of the catalyst may be irreversible and may cause the catalyst in the first reactor 404 in the series to become spent. Once the catalyst is deemed to be a spent catalyst, one or more valves may be operated to separate the reactor containing the spent catalyst from the remaining reactors. In an embodiment, the first reactor 404 may be isolated by closing valves 454, 458, and 460. Valve 456 may be opened to allow furnace 406 and reactor 408 to be dynamically reordered as the first furnace 406 and reactor 408 in the series of reactors. In an embodiment, furnace 426 and reactor 428 may be dynamically joined into the reactor series at the same time that reactor 404 is isolated from the reactor series to obtain the desired conversion of aliphatic, alicyclic, and/or naphthenic hydrocarbons to aromatic hydrocarbons in the reactor section 400. Valves 450 and 462 may be opened and valve 452 closed to establish the new order of reactors in the series.

The ability of the reactor containing the spent catalyst (e.g., reactor 404) to convert aliphatic, alicyclic, and/or naphthenic hydrocarbons in the hydrocarbon stream to aromatic hydrocarbons may then be restored. In an embodiment, the ability to convert aliphatic, alicyclic, and/or naphthenic hydrocarbons to aromatic hydrocarbons may be restored by replacing the spent catalyst in the reactor with fresh catalyst, regenerating the catalyst, and/or rejuvenating the catalyst. Regeneration and rejuvenation are described in more detail below. Suitable procedures known in the art may be used to replace the spent catalyst in the reactor with fresh catalyst at desired intervals. In an embodiment, each reactor may be restored at an equal time interval based on the expected life of the catalyst in the reforming process. In an embodiment, each reactor may be restored based on measurable indicators of the catalyst activity. For example, an outlet temperature rise may indicate a loss of activity for an endothermic reaction, and/or a decrease in the product concentration at the outlet of the reactor may indicate a decrease in the catalyst activity or performance. The fresh catalyst has a higher activity or performance as compared to the spent catalyst. The spent catalyst may then be disposed of or recycled to recover the active catalytic materials for future use.

Once the ability of the reactor to convert aliphatic, alicyclic, and/or naphthenic hydrocarbons to aromatic hydrocarbons has been restored, the reactor may be optionally prepared to resume conversion of the hydrocarbon stream comprising the aliphatic, alicyclic, and/or naphthenic hydrocarbons. In an embodiment, a variety of processes may be used to prepare the catalyst for use in the reforming process. For example, the reactor may be flushed with an inert gas and the catalyst reduced prior to introduction of a hydrocarbon stream to the reactor. In an embodiment, the catalyst may be heated and/or exposed to a heated inert gas to allow any components of the catalyst that may evolve or desorb to be removed prior to contacting the catalyst with a hydrocarbon stream. For example, a catalyst comprising a halide may evolve some of the halide during exposure to the hydrocarbon stream. Preparing the catalyst by exposing the catalyst to a heated gas coupled to a halide removal system may allow a portion of the halides that would otherwise evolve or desorb during the reforming process to be removed prior to the reactor being placed in the series of reactors. As a halide may reduce the activity of any downstream catalysts, preparing the fresh catalysts in this way may help avoid reducing the activity of the catalysts contained in the other reactors in the reforming process. Additional suitable preparation procedures are known in the art. In an embodiment, the reactor may not be prepared for use with the process until shortly before the reactor is to be placed back into the reactor series.

In an embodiment, preparing the reactor to resume conversion of the hydrocarbon stream comprising the aliphatic, alicyclic, and/or naphthenic hydrocarbons comprises reducing the catalyst with a compound that reversibly reduces the activity of the catalyst. Suitable compounds may include, but are not limited to, hydrogen, halides, carbon monoxide, or organic molecules that may reversibly adsorb and later desorb from the catalyst. By reversibly reducing the reactivity of the catalyst, the conversion in the restored reactor may be more gradually increased when hydrocarbons are reintroduced to the reactor.

Once the reactor has been restored and prepared for the reforming process, the reactor can be returned to the hydrocarbon stream by being placed back into service within the series of reactors. In an embodiment, the reactor may not be placed back into the series of reactors until another at least one reactor is deemed to contain a spent catalyst, which may be determined using any of the methods described above. For example, the most recently restored and prepared reactor may be maintained as a backup reactor until a reactor within the reactor scheme is deemed to contain a spent catalyst. The reactor may be placed back within the series of reactors by operating one or more valves to return the reactor to the hydrocarbon stream. The reactor may be placed as the first or last reactor in the reactor series, or alternatively at some point between the first and last reactors in the reactor series. In an embodiment, the reactor 404, having been isolated and the catalyst restored as described herein, may be placed back into service within the reactor series as the last reactor in the reactor series. This may be accomplished by closing valve 462 to the effluent header 442 and opening valve 464 to route the effluent from reactor 428 to flow line 444. Valve 454 can be closed to direct the effluent from reactor 428 to furnace 402 and subsequently through reactor 404. Valves 458 and 456 can be closed and valve 460 opened to route the effluent from reactor 404 to the effluent header 442. In turn, reactor 408 can be isolated for restoration by closing valves 466 and 468, and valve 470 can be opened to provide the hydrocarbon stream to the furnace 410 and reactor 412, which would become the first reactor in the reordered reactor series. Once the reactor that has been restored and prepared is placed back into the reactor series, the reforming reactor system can resume operations to convert at least a portion of the aliphatic, alicyclic, and/or naphthenic hydrocarbons in the hydrocarbon stream to aromatic hydrocarbons.

This process may be repeated each time a reactor contains a catalyst that is deemed to be spent by operating the appropriate valves in the reactor system. For example, reactor 408 may be placed back into the series of reactors as the last reactor, and reactor 412 may be isolated with the hydrocarbon routed to furnace 414 and reactor 416 as the first reactor in the series of reactors. Continuing with the example, reactor 412 may be placed back into the series of reactors as the last reactor upon restoring and preparing the catalyst, and reactor 416 may be isolated with the hydrocarbon routed to furnace 418 and reactor 420 as the first reactor in the series of reactors. This process may be repeated through the series of reactors and may continue for an indefinite period of time. In an embodiment, the reactors may be isolated out of turn. For example, reactor 408 may be placed back into the series of reactor as the last reactor, and reactor 420 may be isolated as the next reactor with a spent catalyst. In an embodiment, two or more reactors may be isolated at the same time. In an embodiment, the isolated reactor may not be placed back into the series of reactors as the last reactor. For example, the use of the feed header 440, the effluent header 442, and one or more flow lines may allow for the dynamic ordering of the reactors as desired, based for example on the reactivity of the catalyst in each reactor. In an embodiment, the isolation, restoration, and preparation of the catalyst may be applicable to both the reactor and a reactor-furnace pair. As a result, each embodiment describing the isolation, restoration, and preparation of the catalyst in a reactor may also be applicable to a corresponding embodiment using one or more reactor-furnace pairs. The ability to isolate one or more reactors and/or reactor-furnace pairs in the system may allow for the continuous operation of the reactor system while also allowing for the restoration of the activity of the catalyst in the reactor. This process offers the advantage of avoiding a complete shutdown of the system that would otherwise be necessary to restore the activity of one or more reactors.

Figure 5:
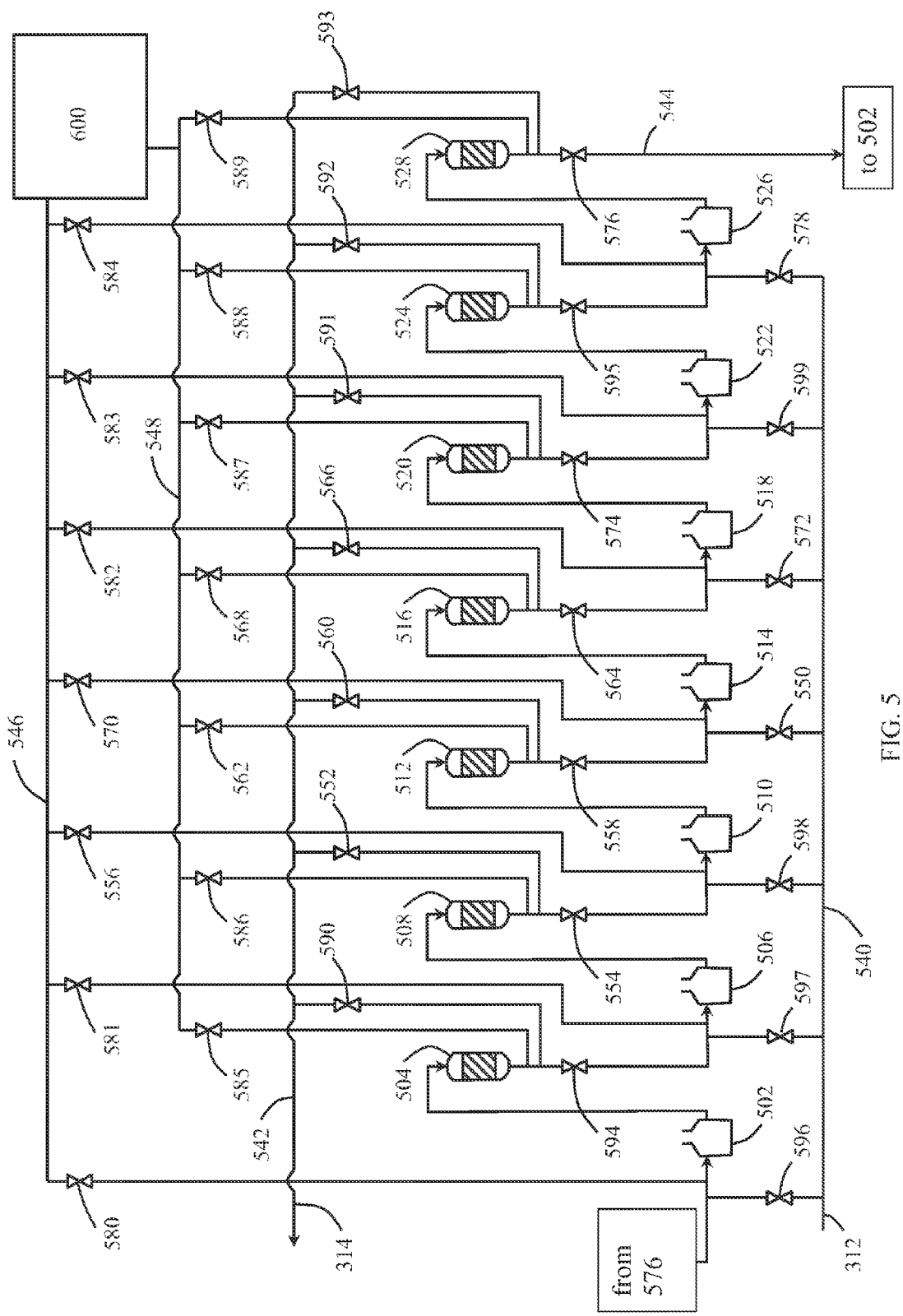
FIG. 5 is a flow diagram of still another embodiment of a reactor section of the FIG. 6 is a flow diagram of an embodiment of the disclosure.

An embodiment of another reactor section 500 is shown in FIG. 5, which may be used in the process of FIG. 3 and is similar to the embodiment of FIG. 4. While reactor section 500 is discussed in the context of the reforming process 300, an embodiment of the reactor section 500 could also be used in place of the reactor section 200 in the reforming process 100 of FIG. 1. The additional lines in the reactor section 500 allow for a dynamic flow scheme along with regeneration and/or rejuvenation of one or more reactors. In an embodiment, the dynamic flow scheme shown in FIG. 5 is provided through the use of a feed header 540, an effluent header 542, flow line 544, a supply header 546, a return header 548, and a plurality of valves 550, 552, 554, 556, 558, 560, 562, 564, 566, 568, 570, 572, 574, 576, 578, 580, 581, 582, 583, 584, 585, 586, 587, 588, 589, 590, 591, 592, 593, 594, 595, 596, 597, 598, 599 disposed in the flow lines.

The reactor section 500 may consist of a plurality of reactors with one or more additional reactors available as spare reactors or additional reactors for use in the process. In an embodiment, the feed header 540 is provided to allow the hydrocarbon stream to be directed to any reactor in the series of reactors. A series of valves may be provided in the lines between the feed header 540 and the inlet to each furnace 502, 506, 510, 514, 518, 522, and 526. An effluent header 542 is provided to allow the effluent from any desired reactor to be directed to line 314 leading out of the reactor section. A series of valves may be provided in the lines between the effluent header 542 and the outlet line from each reactor 504, 508, 512, 516, 520, 524, and 528. A flow line 544 is provided between the outlet of reactor 528 and the inlet to furnace 502.

While only a single flow line 544 is shown in FIG. 5 for simplicity, it should be understood that any number of additional flow lines may be provided between the outlet of the reactors 504, 508, 512, 516, 520, 524, 528 and the inlet of any of the furnaces 502, 506, 510, 514, 518, 522, 526. This arrangement may allow for the rearrangement of the furnaces and reactors (e.g., the reactor-furnace pairs) in any desired order. In the embodiment shown in FIG. 5, a valve 576 may be provided in the flow line 544 to selectively allow flow from the reactor 528 to the furnace 502. A return header 548 is provided to allow the effluent from a reactor to pass to a regeneration and/or rejuvenation process 600. A supply header 546 is provided from the regeneration and/or rejuvenation process to the inlet of each furnace. Valves are provided in the lines between the supply header 546 and the inlet of each furnace 502, 506, 510, 514, 518, 522, 526 and in the lines between the return header 548 and the outlet of each reactor 504, 508, 512, 516, 520, 524, 528. The valves may be selectively operated to provide a desired flow scheme using the series of reactors. As part of the desired flow scheme, one or more reactors in the series may be isolated to allow for the catalyst within the reactors to be restored prior to being placed back into the series of reactors. The supply header 546 and return header 548 may be used to restore the catalyst in a reactor in-situ using the regeneration and/or rejuvenation system 600.

Figure 6:
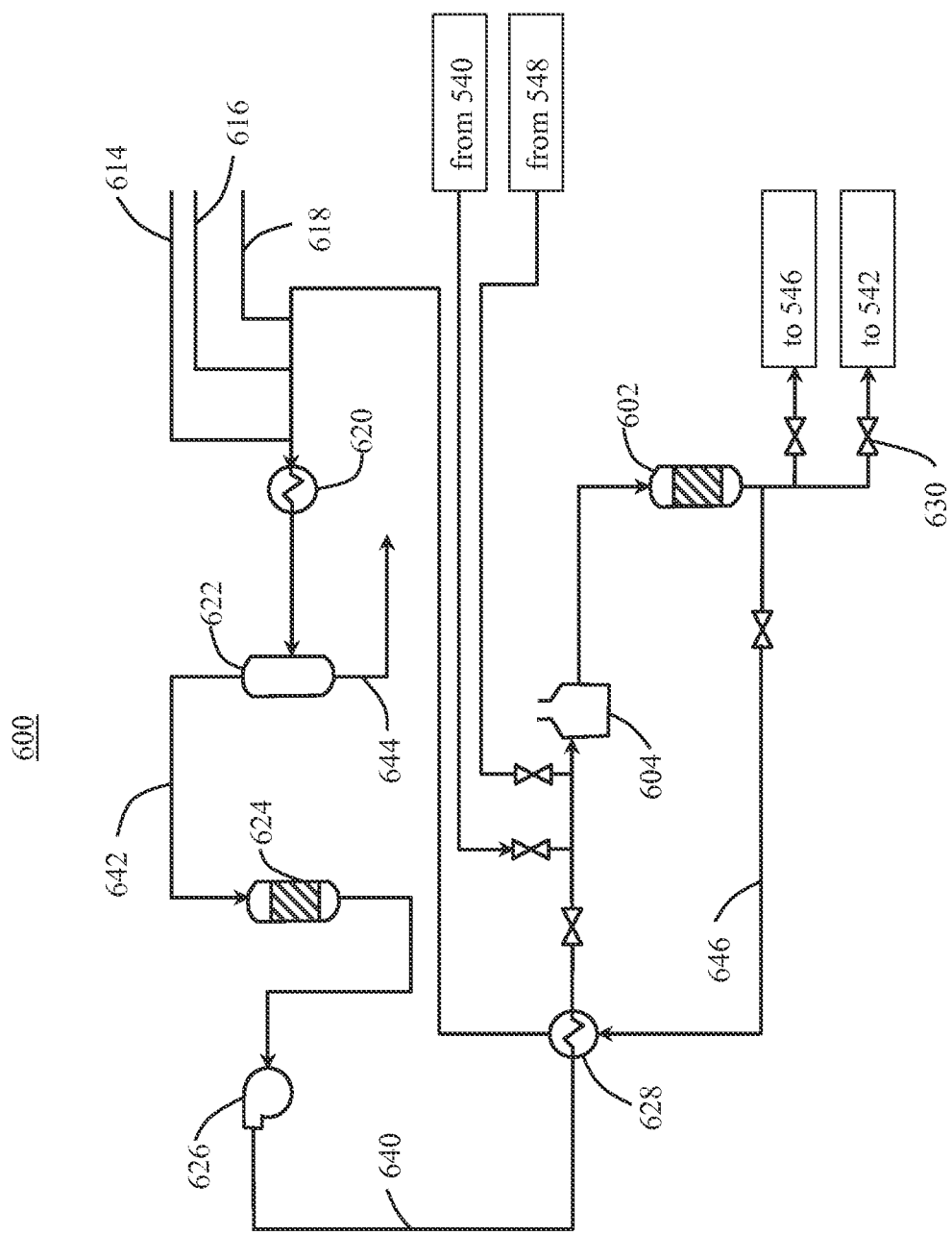

As shown in FIG. 6, regeneration and/or rejuvenation system 600 may be used to restore the ability of the reactor containing a spent catalyst to convert aliphatic, alicyclic, and/or naphthenic hydrocarbons in the hydrocarbon stream to aromatic hydrocarbons. The system 600 includes a furnace 604 and reactor 602, which represent one of the furnace and reactor-furnace pairs isolated from the reactor section using one or more valves of FIG. 5. After a reactor has been isolated (for example, as discussed with reference to FIG. 3 and FIG. 4), regeneration gases such as nitrogen, hydrogen, and/or oxygen may be supplied by lines 614, 616, and 618, respectively. Oxygen may be supplied to the system in the form of air. In the event that a rejuvenation process is used, one or more additional supply lines may be used to provide suitable rejuvenation compounds. For example, a halide (e.g., a halide containing gas and/or compound) may be introduced into the reactor 602 to rejuvenate the catalyst contained therein. The effluent stream 646 from the reactor 602 may pass through heat exchanger 628 and further pass to a cooler 620 before passing to a separator 622. The separator may be a flash drum or a multistage separator column. Water present in the effluent stream may be drawn from the bottom of the separator 622 as stream 644. The remaining gases may pass out of the top of separator 622 as stream 642 and pass through a drier 624 before passing to a compressor 626. The stream 640 may then pass to a heat exchanger 628 before passing to the isolated furnace 604.

In an embodiment, the system 600 may be used for regeneration and/or rejuvenation. The catalyst can be regenerated in accordance with any known regeneration procedure for sulfur sensitive catalysts as described in more detail below. In an embodiment, system 600 can be used to regenerate and/or rejuvenate a catalyst in an isolated reactor in-situ. In this embodiment, the Alternatively, system 600 can be used to regenerate and/or rejuvenate a catalyst that has been removed from a reactor and transferred to a separate regeneration and/or rejuvenation vessel (e.g., ex-situ regeneration/rejuvenation). For example, the catalyst in one of the reactors 504, 508, 512, 516, 520, 524, 528 of FIG. 5 may be removed and transferred to the reactor 602 that acts as a separate regeneration and/or rejuvenation vessel. Upon regenerating and/or rejuvenating the catalyst, the restored catalyst may be transferred from the vessel 602 back into the same reactor 504, 508, 512, 516, 520, 524, 528 or a different reactor 504, 508, 512, 516, 520, 524, 528 of the series of reactors.

Regeneration generally refers to restoring the catalyst by removing one or more contaminants on the catalyst. For example, regeneration may involve the conversion of carbonaceous material on the catalyst to carbon oxides and water. Decoking is one example of a regeneration process. In this process, oxygen, which may be supplied in the form of air, is provided to the reactor (e.g., an isolated reactor for in-situ regeneration) at an appropriate temperature. The carbon deposits are thereby oxidized to form carbon dioxide and water. The water is subsequently removed from the system in the separator 622 and the carbon dioxide may be removed from the system using a takeoff stream (not shown) or bleeding a portion of the regeneration gases to the effluent header 542 through valve 630. The regeneration process may continue until a desired level of regeneration has occurred. During this period, the streams may continue to flow in a loop through system 600.

In an embodiment, a regeneration process may be carried out by heating the spent catalyst to a temperature ranging of from about 25° C. to about 1000° C., alternatively from about 50° C. to about 900° C., alternatively from about 100° C. to about 800° C., alternatively from 200° C. to 700° C., alternatively from 300° C. to 600° C. to produce a decoked spent catalyst. The decoking process may be carried out by heating the spent catalyst for a time of from about 1 hour to about 40 hours, alternatively from about 2 hours to about 25 hours, alternatively from about 3 hours to about 20 hours, alternatively from 4 hours to 15 hours, alternatively from 5 hours to 10 hours to produce a decoked spent catalyst. As discussed above, the decoking process may be carried out by heating the spent catalyst in the presence of oxygen, and the oxygen concentration may be from about 0.01 mol % to about 20 mol % alternatively from about 0.1 mol % to about 15 mol % alternatively from about 0.2 mol % to about 10 mol % alternatively from 0.5 mol % to 5 mol % alternatively from 1 mol % to 3 mol % to produce a decoked spent catalyst. Suitable regeneration processes that can be used in accordance with the present invention are disclosed in U.S. Pat. No. 4,937,215 to Murakawa et al., U.S. Pat. No. 5,260,238 to Murakawa et al., U.S. Pat. No. 5,155,075 to Innes et al., U.S. Pat. No. 4,851,380 to Van Leirsburg et al., and U.S. Pat. No. 7,868,217 to Brown et al., each of which is incorporated herein by reference in its entirety.

In an embodiment, the system 600 may be used to rejuvenate the catalyst in reactor 602. As used herein, rejuvenation refers to a process of reactivating a spent catalyst by decreasing coke content, redispersing metals, and/or introducing a replacement and/or additional catalytic component to the catalyst in order to increase the activity of the catalyst. In an embodiment, rejuvenating a catalyst comprises redispersing the metal in the spent catalyst to produce a redispersed spent catalyst, contacting the redispersed spent catalyst with a reactivating composition to produce a redispersed, reactivated spent catalyst, and thermally treating the redispersed, reactivated spent catalyst to produce a reactivated catalyst. Optionally rejuvenation can be preceded by a regeneration procedure.

In an embodiment, rejuvenating the spent catalyst may begin by decoking the catalyst. Any of the decoking processes described above with respect to the regeneration of the spent catalyst may be used to decoke the catalyst. Following decoking of the spent catalyst, the metal on the decoked spent catalyst may be redispersed on the catalyst support,. While not wishing to be bound by theory, the decoking process in combination with the hydrocarbon conversion process that the spent catalyst was subjected to, may have lead to the agglomeration of the metal on the catalyst support. The agglomerated metal may not be fully available physically and chemically to the catalytic reactions and thus may be redispersed to increase the catalyst activity.

In an embodiment, the metal on the decoked spent catalyst is redispersed using one or more processes generally referred to as oxychlorination. Oxychlorination of the decoked spent catalyst may be carried out by contacting the decoked spent catalyst with a redispersing composition. Suitable redispersing compositions may comprise a chorine-containing compound and oxygen. The chlorine-containing compound may be in the solid phase, liquid phase, gas phase, or any combination thereof. Examples of chlorine-containing compounds suitable for use in the redispersing composition include without limitation hydrochloric acid, chlorine, carbon tetrachloride, tetrachloroethylene, chlorobenzene, methyl chloride, methylene chloride, chloroform, allyl chloride, trichloroethylene, chloramine, chlorine oxides, chlorine acids, chlorine dioxide, dichlorine monoxide, dichlorine heptoxide, chloric acid, perchloric acid, or any combination thereof.

Contacting of the decoked, spent catalyst with the redispersing composition may be carried out over a time period of from about 0.5 hours to about 50 hours, alternatively from about 1 hour to about 20 hours, alternatively from about 2 hours to about 10 hours, at a temperature in the range of from about 25° C. to about 1000° C., alternatively from about 50° C. to about 900° C., alternatively from about 100° C. to about 800° C., alternatively from about 200° C. to about 400° C., alternatively from about 400° C. to about 600° C. Contacting of the decoked, spent catalyst with the redispersing composition may be carried out in the presence of oxygen. When oxygen is used the oxygen concentration may range from about 0.01 mol % to about 20 mol %, alternatively from about 1 mol % to about 18 mol %, alternatively from about 5 mol % to about 15 mol %, alternatively from about 8 mol % to about 12 mol %.

In an embodiment, the decoked, spent catalyst is contacted with a redispersing composition comprising a chorine-containing compound (e.g., HCl) and oxygen in the presence of water. When water is used, the water to HCl mole ratio ($H_2O$: HCl) may be from about 0.01:1 to about 10:1, alternatively from about 0.5:1 to about 5:1, alternatively from about 1:1 to about 3:1. When chorine-containing compounds are used other than HCl, the $H_2O$:HCl mole ratio is calculated based on the equivalent amount of HCl generated in the presence of the spent catalyst.

The spent catalyst may be subjected to a reactivation step, which may occur after the decoked spent catalyst has undergone a redispered as described above. In an embodiment, reactivation of the decoked, redispersed spent catalyst may be carried out using a reactivating composition comprising one or more halogenating agents, including gas phase halogenating agents, liquid phase halogenating agents, solid phase halogenating agents, or any combination thereof. In an embodiment, reactivation of the decoked, redispersed spent catalyst is carried out by contacting the decoked, redispersed spent catalyst with a fluorine-containing solution in a process generally referred to as fluoridation. The fluorine-containing compound may be in the solid phase, liquid phase, gas phase, or any combination thereof. Examples of fluorine-containing compounds suitable for use in this disclosure include without limitation tetramethylammonium fluoride (TMAF), ammonium fluoride ($NH_4F$ or AF), tetrafluoroethylene, 2,2,2-trifluoroethanol (TFE), fluorine ($F_2$), hydrofluoric acid (HF), or combinations thereof. In an embodiment, the fluorine-containing compound is a perfluorinated alkane, perfluornated alcohol or mixtures thereof. Examples of perfluorinated alcohols suitable for use in this disclosure include without limitation 2,2,2-trifluoroethanol (TFE), hexafluoroisopropanol, tetrafluoropropanol, pentafluoropropanol, hexafluorophenylpropanol, perfluorobutyl alcohol, hexafluor-2-propanol, pentafluoro-1-propanol, tetrafluoro-1-propanol, 1,1,1,3,3,3-hexafluoro-2-propanol, 2,2,3,3,3-pentafluoro-1-propanol, and any combination thereof.

In an embodiment, the fluorine-containing compound is an ammonium halide compound and may comprise one or more compounds represented by the general formula $N(R)_4F$, where R represents a hydrogen or a substituted or unsubstituted carbon chain molecule having from 1 to 20 carbons wherein each R may be the same or different. In an embodiment, R is methyl, ethyl, propyl, butyl, or combinations thereof. Alternatively, R is methyl. Examples of suitable ammonium compounds include ammonium fluoride (AF), tetramethylammonium fluoride (TMAF), tetraethylammonium fluoride (TEAF), tetrapropylammonium fluoride, tetrabutylammonium fluoride, methyltriethylammonium fluoride, or any combination thereof. Alternatively, the ammonium halide compound may also comprise at least one hydrofluoric acid and at least one ammonium hydroxide represented by the formula $N(R')_4OH$, where R' is hydrogen or a substituted or unsubstituted carbon chain molecule having from 1 to 20 carbon atoms wherein each R' may be the same or different. In an embodiment, R' is methyl, ethyl, propyl, butyl, or combinations thereof. Alternatively, R' is methyl. Examples of ammonium hydroxides suitable for use in this disclosure include ammonium hydroxide, tetraalkylammonium hydroxides such as tetramethylammonium hydroxide, tetraethylammonium hydroxide, tetrapropylammonium hydroxide, tetrabutylammonium hydroxide, or any combination thereof In an embodiment the decoked, redispersed spent catalyst is contacted with a solution of TMAF in the temperature range of from about 0° C. to about 200° C., alternatively from about 20° C. to about 100° C., alternatively from about 40° C. to about 60° C. for a time period of from about 1 minute to about 100 hours, alternatively about 0.1 hours to about 50 hours, alternatively from about 1 hour to about 24 hours. The solution may also contain one or more suitable solvents.

In an embodiment, the decoked, redispersed spent catalyst may be reactivated through contact with a gas phase fluoridating agent such as, for example, fluorine. In such an embodiment, the gas phase fluoridating agent may be contacted with a decoked, redispersed spent catalyst for a time period of from about 1 minute to about 100 hours, alternatively from about 0.1 hours to about 50 hours, alternatively from about 1 hour to about 24 hours, alternatively from about 4 hours to about 11 hours.

In an embodiment, the decoked, redispersed spent catalyst may be reactivated through contact with a solid phase fluoridating agent such as an organic ammonium halide compound, for example ammonium fluoride, tetramethylammonium fluoride, or any combination thereof. In such an embodiment, the solid phase fluoridating agent may be contacted with a decoked, redispersed spent catalyst at elevated temperatures. The contacting may occur for a time period of from about 1 minute to about 100 hours, alternatively from about 0.1 hours to about 50 hours, alternatively from about 1 hour to about 24 hours, alternatively from about 4 hours to about 11 hours. The elevated temperatures may in the temperature range of from about 0° C. to about 200° C., alternatively from about 20° C. to about 100° C., alternatively from about 40° C. to about 60° C. While not wishing to be limited by theory it is believed that under these conditions some of the solid phase fluoridating agent sublimes and migrates into the decoked, redispersed spent catalyst.

A chorine-containing compound may also be utilized in the reactivation of the decoked, redispersed spent catalyst. The chlorine-containing compound may be in the solid phase, liquid phase, gas phase, or any combination thereof. In an embodiment, the chlorine-containing compound is of the type described above. Examples of chlorine-containing compounds suitable for use in the reactivating composition include without limitation compounds represented by the general formula $N(R)_4Cl$, where R represents a hydrogen or a substituted or unsubstituted carbon chain molecule having 1 to 20 carbons wherein each R may be the same or different. In an embodiment, R is methyl, ethyl, propyl, butyl, or combinations thereof. Alternatively R is methyl. Specific examples of suitable organic ammonium chlorine compounds include ammonium chloride, tetramethylammonium chloride (TMAC), tetraethylammonium chloride, tetrapropylammonium chloride, tetrabutylammonium chloride, methyltriethylammonium chloride, or combinations thereof. Alternatively, the chorine-containing compound is TMAC.

In addition to the embodiments disclosed herein for regenerating and/or rejuvenating the catalyst using system 600, suitable processes for regenerating and/or rejuvenating the catalyst are described in U.S. Pat. No. Re. 34,250 to Van Leirsburg et al., U.S. Pat. No. 4,810,683 to Cohn et al., U.S. Pat. No. 5,776,849 to Fung et al., U.S. Pat. No. 4,855,269 to Mohr, U.S. Pat. No. 4,925,819 to Fung et al., U.S. Pat. No. 5,106,798 to Fung, and U.S. Patent Application Publication No. 2010-0160147 to Wu, each of which is incorporated herein by reference in its entirety. European patent disclosure 316,727, which is also hereby incorporated by reference in its entirety, also describes a process for rejuvenating deactivated Pt-L-zeolite catalysts by treating the catalyst at about 930° F. with a halogen compound such as carbon tetrachloride and nitrogen. Oxygen is then added to the mixture to remove coke and, finally, the catalyst is treated with a chlorofluorocarbon compound, oxygen, and nitrogen.

In still other embodiments, the system 600 may be used to reduce a fresh catalyst in situ or otherwise prepare the catalyst for the introduction of hydrocarbons. For example, the system 600 may be used to flush the catalyst with nitrogen prior to introduction of hydrocarbons to the reactor 602 when the reactor is placed back into the series of reactors in the reforming reaction.

Returning to FIG. 5, a reforming process may be carried out using the reforming reactor section 500. The hydrocarbon stream may first pass through line 312 and enter the feed header 540. In an embodiment, the reactors and furnaces may be arranged so that the hydrocarbon flows serially through the furnaces 514, 518, 522, 526, 502, and 506, and reactors 516, 520, 524, 528, 504, and 508, respectively, where furnace 514 and reactor 516 represent the first furnace and reactor in the series. In this arrangement, all of the valves between the feed header 540 and the furnaces are closed except for valve 550, and all of the valves between the reactors and the effluent header 542 are closed except for valve 552. Valve 576 in flow line 544 is open to allow flow from the outlet of reactor 528 to the inlet of furnace 502. The valves between the reactors and furnaces are open except for valves 554 and 558, which are closed. Furnace 510 and reactor 512 may be isolated from the reactor train initially and maintained as a spare reactor. Furnace 510 may be isolated by closed valve 554. Reactor 512 may be isolated by closing valves 558 and 560. Both furnace 510 and reactor 512 may be in selective fluid communication with the regeneration and/or rejuvenation system 600 by opening or closing valves 556 and 562, and the spent catalyst of reactor 512 may be treated as described with respect to FIG. 6. In an embodiment, valves 556 and 562 may be closed to fully isolate furnace 510 and reactor 512 for catalyst replacement or to resume operations post in-situ treatment.

In an embodiment, the reforming process may not have a sulfur removal system. As a result, the first reactor in the series may be used to absorb any sulfur present in the hydrocarbon stream passing through line 312. The resulting poisoning of the reforming catalyst may be irreversible and may cause the catalyst in the first reactor 516 in the series to become spent. Once the catalyst is deemed to be a spent catalyst, one or more valves may be operated to separate the reactor containing the spent catalyst from the remaining reactors. In an embodiment, the first furnace 514 and reactor 516 may be isolated due to closed valve 566 and further by closing valves 550 and 564. Valves 572 and 574 may be opened to allow furnace 518 and reactor 520 to be dynamically reordered as the first furnace 518 and reactor 520 in the series of reactors. In an embodiment, furnace 510 and reactor 512 may be dynamically joined into the reactor series at the same time that reactor 516 is isolated from the reactor series to obtain the desired conversion of aliphatic, alicyclic, and/or naphthenic hydrocarbons to aromatic hydrocarbons in the reactor section 500. Valves 560 and 554 may then be opened and valve 552 closed to route the effluent from reactor 508 to reactor 512 and onward to the effluent header 542. Valves 556 and 562 may be closed to separate the furnace 510 and reactor 512 from system 600. The newly isolated reactor 516 may be connected to system 600 by opening valves 570 and 568. The spent catalyst of reactor 516 may then be treated as described with respect to FIG. 6.

The ability of the reactor containing the spent catalyst to convert aliphatic, alicyclic, and/or naphthenic hydrocarbons in the hydrocarbon stream to aromatic hydrocarbons may then be restored. In an embodiment, the ability to convert aliphatic, alicyclic, and/or naphthenic hydrocarbons to aromatic hydrocarbons may be restored by replacing the spent catalyst in the reactor with fresh catalyst, regenerating the catalyst, rejuvenating the catalyst, or any combination of these processes.

Once the ability of the reactor to convert aliphatic, alicyclic, and/or naphthenic hydrocarbons to aromatic hydrocarbons has been restored, the reactor may be optionally prepared to resume conversion of the hydrocarbon stream comprising the aliphatic, alicyclic, and/or naphthenic hydrocarbons. In an embodiment, a variety of processes may be used to prepare the catalyst for use in the reforming process. For example, the reactor may be flushed with an inert gas or a reducing gas using, for example, system 600, and the catalyst may be reduced prior to introduction of a hydrocarbon stream to the reactor. In an embodiment, the catalyst may be heated and/or exposed to a heated inert gas to allow any components of the catalyst that may evolve to be removed prior to contacting the catalyst with a hydrocarbon stream. For example, a catalyst comprising a halide may evolve some of the halide during exposure to the hydrocarbon stream. Preparing the catalyst by exposing the catalyst to a heated gas using system 600 coupled to a halide removal system may allow a portion of the halides that would otherwise evolve during the reforming process to be removed prior to the reactor being placed in the series of reactors. As a halide may reduce the activity of any downstream catalysts, preparing the fresh catalysts in this way may help avoid reducing the activity of the catalysts contained in the other reactors in the reforming process. Additional suitable preparation procedures are known in the art. In an embodiment, the reactor may not be prepared for use with the process until shortly before the reactor is to be placed back into the reactor series.

In an embodiment, preparing the reactor to resume conversion of the hydrocarbon stream comprising the aliphatic, alicyclic, and/or naphthenic hydrocarbons comprises reducing the catalyst with a compound that reversibly reduces the activity of the catalyst. Suitable compounds may include, but are not limited to, hydrogen, halides, or organic molecules that may reversibly absorb and later desorb from the catalyst. By reversibly reducing the reactivity of the catalyst, the conversion in the restored reactor may be more gradually increased when hydrocarbons are reintroduced to the reactor.

Once the reactor has been restored and prepared for the reforming process, the reactor can be returned to the hydrocarbon stream by being placed back in service within the series of reactors. In an embodiment, the reactor may not be placed back into the series of reactors until another at least one reactor is deemed to contain a spent catalyst. For example, the most recently restored and prepared reactor may be maintained as a backup reactor until a reactor within the reactor scheme is deemed to contain a spent catalyst. The reactor may be placed back within the series of reactors by operating one or more valves to return the reactor to the hydrocarbon stream. The reactor can be placed as the first or last reactor in the reactor series, or alternatively at some point between the first and last reactors in the reactor series. In an embodiment, the reactor 516 having been taken offline and the catalyst restored as described herein may be placed back into service within the reactor series as the last reactor in the reactor series. This may be accomplished by closing valve 564 and opening valve 566 to route the effluent from reactor 516 to the effluent header 542. Valve 560 can be closed and valve 558 opened to direct the effluent from reactor 512 to furnace 514 and subsequently through reactor 516. In turn, reactor 520 can be isolated for restoration by closing valves 564 and 574. Additional valves may be opened or closed to produce a desired reactor configuration and/or connection between the isolated reactor and system 600. Once the reactor that has been restored and prepared is placed back into the reactor series, the reforming reactor system can resume operations to convert at least a portion of the aliphatic, alicyclic, and/or naphthenic hydrocarbons in the hydrocarbon stream to aromatic hydrocarbons.

This process may be repeated each time a reactor contains a catalyst that is deemed to be spent by operating the appropriate valves in the reactor system. For example, reactor 520 may be placed back into the series of reactors as the last reactor, and reactor 524 may be isolated with the hydrocarbon routed to furnace 526 and reactor 528 as the first reactor in the series of reactors. Continuing with the example, reactor 524 may be placed back into the series of reactors as the last reactor upon restoring and preparing the catalyst, and reactor 528 may be isolated with the hydrocarbon routed to furnace 502 and reactor 504 as the first reactor in the series of reactors. This process may be repeated through the series of reactors and may continue for an indefinite period of time. In an embodiment, the reactors may be isolated out of turn. For example, reactor 520 may be placed back into the series of reactor as the last reactor, and reactor 508 may be isolated as the next reactor with a spent catalyst. In an embodiment, two or more reactors may be isolated at the same time. In an embodiment, the isolated reactor may not be placed back into the series of reactors as the last reactor. For example, the use of the feed header 540, the effluent header 542, and one or more recycle lines may allow for the dynamic ordering of the reactors as desired, based for example on the reactivity of the catalyst in each reactor. In an embodiment, the isolation, restoration, and preparation of the catalyst may be applicable to both the reactor and a reactor-furnace pair. As a result, each embodiment describing the isolation, restoration, and preparation of the catalyst in a reactor may also be applicable to a corresponding embodiment using one or more reactor-furnace pairs. The ability to isolate one or more reactors in the system may allow for the continuous operation of the reactor system while also allowing for the restoration of the activity of the reactor, including the ability to regenerate and/or rejuvenate the catalyst in-situ. This process offers the advantage of avoiding a complete shutdown of the system that would otherwise be necessary to restore the activity of one or more reactors.

In an embodiment, a method comprises operating a reforming reactor system comprising a plurality of reactors until a reactor is deemed to contain a spent catalyst, wherein each of the plurality of reactors contains a catalyst comprising a zeolite capable of converting at least a portion of a hydrocarbon stream to aromatic hydrocarbons; isolating the reactor containing the spent catalyst from a remaining plurality of reactors; restoring the ability of the reactor containing the spent catalyst to convert at least a portion of the hydrocarbon stream to aromatic hydrocarbons; preparing the reactor to resume conversion of the hydrocarbon stream; returning the reactor to the hydrocarbon stream by connecting the reactor to the remaining plurality of reactors in a new order; and resuming operations of the reforming reactor system to convert at least the portion of the hydrocarbon stream to aromatic hydrocarbons. The ability to re-order the reactors may allow the first reactor in the new series to be used to absorb sulfur, which may allow the system and process to operate without using a sulfur removal system. This embodiment allows for the elimination of the sulfur removal system, a heat exchanger, and the associated cost of operating the sulfur removal system, which may include the material absorbent costs for example. While the reaction of the catalyst in the first reactor may be irreversible and require that the catalyst be replaced rather than regenerated and/or rejuvenated, the resulting costs savings and process simplification may outweigh the catalyst replacement costs. Further the ability to continue to operate the reforming process while restoring the spent catalyst in the reactor represents an advantage over embodiments that require a shutdown of the process for catalyst replacement.

As a further advantage of the system and methods disclosed herein, the operating conditions of the reforming reaction can be altered to produce further operational advantages. In an embodiment, the operating conditions of the reforming process may be reduced in severity using the systems and methods disclosed herein. For example, the pressures and temperatures used in the system, including the reforming reactor section, may be reduced. In an embodiment, the temperatures within the system may be maintained below about 800° F., alternatively below about 750° F., or alternatively below about 700° F. The reduction of the temperature in the reactor section may result in decreased conversion efficiency for each pass of the hydrocarbon through the reactor series. In order to compensate for this reduction in conversion efficiency, a recycle stream comprising the unreacted reactants may be used to produce an overall equivalent conversion efficiency or the reactors may be resized as needed. A plurality of recycle lines may be used within the system to allow for multiple recycle configurations within the reactor series, as discussed in more detail with respect to FIG. 4 and FIG. 5 herein. Further, the reduction in operating temperature may allow for the reduction or elimination of coatings on the surfaces of the piping and equipment contacting the hydrocarbon stream as described above. The reduction or elimination of the metal protective coatings may represent a significant cost savings in the overall system.

In another embodiment, the operating conditions of the reforming process can be made more severe. This may include increasing the temperature and/or pressure in the reforming reactor section, and changing the process stream flowrates and/or the reactant ratio. In an embodiment, the weight hourly space velocity may be increased by at least about 50%, alternatively at least about 75%, or alternatively at least about 100% relative to a process without a dynamic flow scheme. In an embodiment, the ratio of hydrogen to hydrocarbon within the reactor may be reduced by at least about 10%, at least about 25%, or alternatively at least about 50% relative to a process without a dynamic flow scheme. The increase in severity of the conditions can result in an increased conversion efficiency, which may translate as an increased throughput or an increased conversion per pass for an equivalent flowrate. However an increase in the severity of the conditions can also result in a decreased catalyst life such that the catalyst deactivates at a faster rate. The catalyst deactivation is mitigated by the ability to restore the catalyst productivity while continuing to operate the reforming process. The overall result of increasing the severity of the conditions may be to increase the economics of the reforming process, representing an advantage of the systems and methods disclosed herein.

Additional Embodiments

The following are nonlimiting, specific embodiments in accordance with the present disclosure:

Embodiment A. A process for operating a reforming reactor system comprising:
  operating a plurality of reactors until at least one reactor is deemed to have an operational issue, wherein each of the plurality of reactors contains a catalyst capable of converting at least a portion of a hydrocarbon stream to aromatic hydrocarbons;
  isolating the at least one reactor deemed to have the operational issue from a remaining plurality of reactors that continue to operate to convert at least the portion of the hydrocarbon stream to aromatic hydrocarbons while the at least one reactor deemed to have the operational issue is isolated from the plurality of remaining reactors;
  addressing the operational issues;
  returning the at least one reactor to the hydrocarbon stream by connecting the reactor to the remaining plurality of reactors;
  resuming operations of the reforming reactor system to convert at least the portion of the hydrocarbon stream to aromatic hydrocarbons.

Embodiment B. The process of embodiment A, wherein the operational issue comprises deeming the catalyst in the at least one reactor be a spent catalyst.

Embodiment C. The process of embodiment B, wherein deeming the reactor to contain a spent catalyst is based on operational considerations, economic considerations, catalyst performance, or any combination thereof.

Embodiment D. The process of embodiment B or C, wherein addressing the operational issue comprises replacing the spent catalyst with a new catalyst; replacing the spent catalyst with a rejuvenated catalyst; processing the spent catalyst to rejuvenate the spent catalyst; or processing the spent catalyst to regenerate the spent catalyst.

Embodiment E. The process of embodiment D, wherein processing the spent catalyst to rejuvenate the spent catalyst comprises rejuvenating the spent catalyst in situ; or wherein processing the spent catalyst to regenerate the spent catalyst comprises regenerating the spent catalyst in situ.

Embodiment F. The process of embodiment A, wherein the operational issue comprises inspection and/or servicing of the at least one reactor; and wherein addressing the operational issue comprises inspecting and/or servicing of the at least one reactor.

Embodiment G. The process of embodiment A, wherein the operational issue comprises inspection and/or servicing of a safety system associated with the at least one reactor, and wherein addressing the operational issue comprises inspecting and/or servicing of the safety system of the at least one reactor.

Embodiment H. The process of any of embodiments A to G further comprising preparing the at least one reactor to resume conversion of the hydrocarbon stream prior to returning the at least one reactor to the hydrocarbon stream by connecting the reactor to the remaining plurality of reactors.

Embodiment I. The process of embodiment H, wherein preparing the at least one reactor to resume conversion of the hydrocarbon stream comprises contacting the catalyst within the at least one reactor with a compound that reversibly reduces a reactivity of the catalyst.

Embodiment J. The process of embodiment H, wherein the compound that reversibly reduces the reactivity of the catalyst comprises hydrogen, a halide, carbon monoxide, organic molecules, or any combination thereof that reversibly adsorb and later desorb from the catalyst.

Embodiment K. The process of any of embodiments A to J, wherein returning the at least one reactor to the hydrocarbon stream by connecting the reactor to the remaining plurality of reactors comprises returning the at least one reactor to the hydrocarbon stream by connecting the reactor to the remaining plurality of reactors at a new location in a flow path of the hydrocarbon stream flow.

Embodiment L. The process of any of embodiments A to K, further comprising: feeding the hydrocarbon stream to the plurality of reactors at a new location after returning the at least one reactor to the hydrocarbon stream by connecting the reactor to the remaining plurality of reactors.

Embodiment M. The process of embodiment L, wherein feeding the hydrocarbon stream to the plurality of reactors at the new location comprises reconfiguring the flow of the hydrocarbon stream through the plurality of reactors.

Embodiment N. The process of any of embodiments A to M, wherein the catalyst comprises at least one Group VIII metal and zeolitic support.

Embodiment O. The process of embodiment N, wherein the least one Group VIII metal comprises platinum and the zeolitic support comprises silica bound L-zeolite.

Embodiment P. The process of any of embodiments A to O, wherein the catalyst comprises one or more halogens.

Embodiment Q. The process of any of embodiments A to P, further comprising coating one or more surfaces of at least one of the plurality of reactors that are in contact with the hydrocarbon stream with a metal protective coating.

Embodiment R. The process any of embodiments A to Q further comprising: operating a sulfur removal system upstream of the plurality of reactors.

Embodiment S. The process any of embodiments A to Q further comprising the omission of a sulfur removal system upstream of the plurality of reactors.

Embodiment T. A system comprising:
a plurality of reactor-furnace pairs coupled by flow lines, wherein each reactor-furnace pair comprises a furnace coupled to a reactor, wherein each reactor comprises a reforming catalyst;
a feed header coupled to the plurality of reactor-furnace pairs by a plurality of feed lines;
an effluent header coupled to the plurality of reactor-furnace pairs by a plurality of effluent lines;
a plurality of valves disposed in the flow lines, the feed lines, and the effluent lines, wherein the valves are capable of being dynamically operated to create a serial flow path through the plurality of reactor-furnace pairs.

Embodiment U. The system of embodiment T, wherein the plurality of valves are further configured to route the serial flow path to bypass at least one reactor-furnace pair.

Embodiment V. The system of embodiment U, wherein the plurality of valves are configured to reconnect the bypassed at least one reactor-furnace pair in a second serial flow path through the plurality of reactor-furnace pairs.

Embodiment W. The system of embodiment T, U or V, further comprising:
a supply header coupled to the plurality of reactor-furnace pairs by a plurality of supply lines;
a return header coupled to the plurality of reactor-furnace pair by a plurality of return lines;
a flow system coupled to the supply header and the return header for providing a fluid to at least one of the plurality of reactor-furnace pairs; and
a plurality of flow system valves disposed in the supply lines and the return lines, wherein the plurality of flow system valves are capable of being dynamically operated to couple one or more of the plurality of reactor-furnace pairs to the flow system.

While the present disclosure has been illustrated and described in terms of particular apparatus and methods of use, it is apparent that equivalent techniques, components and constituents may be substituted for those shown, and other changes can be made within the scope of the present disclosure as defined by the appended claims.

The particular embodiments disclosed herein are illustrative only, as the disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

We claim:

1. A process for operating a reforming reactor system comprising:
operating a plurality of reactors until at least one reactor is deemed to have an operational issue, wherein each of the plurality of reactors contains a catalyst capable of converting at least a portion of a hydrocarbon stream to aromatic hydrocarbons, wherein the plurality of reactors comprises three or more serially connected reactors, wherein the hydrocarbon stream flows along a first flow path through the plurality of reactors in a first order, and wherein the at least one reactor is adjacent to a second reactor of the plurality of reactors in the first flow path;
isolating the at least one reactor deemed to have the operational issue from a remaining plurality of reactors that continue to operate to convert at least the portion of the hydrocarbon stream to aromatic hydrocarbons while the at least one reactor deemed to have the operational issue is isolated from the plurality of remaining reactors;

addressing the operational issues;

reconnecting the at least one reactor to the remaining plurality of reactors at a new location to form a second flow path of the hydrocarbon stream through the plurality of reactors, and wherein the at least one reactor is not adjacent to the second reactor in the second flow path; and resuming operations of the reforming reactor system to convert at least the portion of the hydrocarbon stream to aromatic hydrocarbons.

2. The process of claim 1, wherein the catalyst comprises at least one Group VIII metal and zeolitic support.

3. The process of claim 2, wherein the least one Group VIII metal comprises platinum and the zeolitic support comprises silica bound L-zeolite.

4. The process of claim 1, wherein the catalyst comprises one or more halogens.

5. The process of claim 1, wherein the operational issue comprises deeming the catalyst in the at least one reactor be a spent catalyst.

6. The process of claim 5, wherein addressing the operational issue comprises replacing the spent catalyst with a new catalyst.

7. The process of claim 5, wherein addressing the operational issue comprises replacing the spent catalyst with a rejuvenated catalyst 8. The process of claim 5, wherein addressing the operational issue comprises processing the spent catalyst to rejuvenate the spent catalyst.

9. The process of claim 8, wherein processing the spent catalyst to rejuvenate the spent catalyst comprises rejuvenating the spent catalyst in situ.

10. The process of claim 5, wherein addressing the operational issue comprises processing the spent catalyst to regenerate the spent catalyst.

11. The process of claim 10, wherein processing the spent catalyst to regenerate the spent catalyst comprises regenerating the spent catalyst in situ.

12. The process of claim 1, wherein the operational issue comprises inspection and/or servicing of the at least one reactor.

13. The process of claim 12, wherein addressing the operational issue comprises inspecting and/or servicing of the at least one reactor.

14. The process of claim 1, wherein the operational issue comprises inspection and/or servicing of a safety system associated with the at least one reactor.

15. The process of claim 14, wherein addressing the operational issue comprises inspecting and/or servicing of the safety system of the at least one reactor.

16. The process of claim 1, further comprising preparing the at least one reactor to resume conversion of the hydrocarbon stream prior to returning the at least one reactor to the hydrocarbon stream by connecting the reactor to the remaining plurality of reactors.

17. The process of claim 16, wherein preparing the at least one reactor to resume conversion of the hydrocarbon stream comprises contacting the catalyst within the at least one reactor with a compound that reversibly reduces a reactivity of the catalyst.

18. The process of claim 17, wherein the compound that reversibly reduces the reactivity of the catalyst comprises hydrogen, a halide, carbon monoxide, organic molecules, or any combination thereof that reversibly adsorb and later desorb from the catalyst.

19. The process of claim 1, further comprising:

feeding the hydrocarbon stream to the plurality of reactors at a new location after reconnecting the at least one reactor to the remaining plurality of reactors.

20. The process of claim 19, wherein feeding the hydrocarbon stream to the plurality of reactors at the new location comprises reconfiguring the flow of the hydrocarbon stream through the plurality of reactors.

21. The process of claim 1, further comprising operating a sulfur removal system upstream of the plurality of reactors.

22. The process of claim 1, further comprising the omission of a sulfur removal system upstream of the plurality of reactors.

23. A method comprising:

operating a reforming reactor system comprising a plurality of reactors connected in a first order until a first reactor of the plurality of reactors is deemed to contain a spent catalyst, wherein each of the plurality of reactors contains a catalyst comprising a zeolite capable of converting at least a portion of a hydrocarbon stream to aromatic hydrocarbons, wherein the plurality of reactors comprises three or more serially connected reactors, wherein the hydrocarbon stream flows along a first flow path through the plurality of reactors in the first order, wherein at least one reactor of the plurality of reactors is downstream of both the first reactor and a second reactor in the first order;

isolating the first reactor containing the spent catalyst from the remaining reactors, wherein the remaining reactors continue to operate to convert at least the portion of the hydrocarbon stream to aromatic hydrocarbons when the first reactor is isolated from the remaining reactors;

restoring the ability of the first reactor containing the spent catalyst to convert at least a portion of the hydrocarbon stream to aromatic hydrocarbons;

returning the first reactor to the remaining reactors at a new location to form a second flow path of the hydrocarbon stream through the plurality of reactors, wherein the hydrocarbon stream flows along the second flow path through the plurality of reactors in a second order, and wherein the first reactor is the last reactor in the second flow path of the hydrocarbon stream through the plurality of reactors;

resuming operations of the reforming reactor system until the second reactor of the plurality of reactors is deemed to contain a spent catalyst;

isolating the second reactor containing the spent catalyst from the remaining reactors, wherein the remaining reactors continue to operate to convert at least the portion of the hydrocarbon stream to aromatic hydrocarbons when the second reactor is isolated from the remaining reactors;

restoring the ability of the second reactor containing the spent catalyst to convert at least a portion of the hydrocarbon stream to aromatic hydrocarbons; and returning the second reactor to the remaining reactors at a new location a third flow path of the hydrocarbon stream through the plurality of reactors, wherein the hydrocarbon stream flows along the third flow path through the plurality of reactors in a third order, and wherein the second reactor is the at least reactor in the third flow path of the hydrocarbon stream through the plurality of reactors.

24. The method of claim 23, further comprising:
resuming operations of the reforming reactor system until a third reactor of the plurality of reactors is deemed to contain a spent catalyst;
isolating the third reactor containing the spent catalyst from the remaining reactors, wherein the remaining reactors continue to operate to convert at least the portion of the hydrocarbon stream to aromatic hydrocarbons when the third reactor is isolated from the remaining reactors;
restoring the ability of the third reactor containing the spent catalyst to convert at least a portion of the hydrocarbon stream to aromatic hydrocarbons; and
returning the third reactor to the hydrocarbon stream to connect the plurality of reactors in a fourth order.

25. A process for operating a reforming reactor system comprising:
operating a plurality of reactors until at least one reactor is deemed to have an operational issue, wherein each of the plurality of reactors contains a catalyst capable of converting at least a portion of a hydrocarbon stream to aromatic hydrocarbons, wherein a sulfur removal system is not located upstream of the plurality of reactors, and wherein the hydrocarbon stream fed to the plurality of reactors comprises sulfur, wherein the plurality of reactors comprises three or more serially connected reactors, wherein the hydrocarbon stream flows along a first flow path through the plurality of reactors in a first order, wherein the at least one reactor is adjacent to a second reactor of the plurality of reactors in the first flow path, and wherein a low activity reactor is downstream of at least one reactor of the plurality of reactors in the first flow path through the plurality of reactors in the first order;
isolating the at least one reactor deemed to have the operational issue from a remaining plurality of reactors that continue to operate to convert at least the portion of the hydrocarbon stream to aromatic hydrocarbons while the at least one reactor deemed to have the operational issue is isolated from the plurality of remaining reactors;
addressing the operational issues;
reconnecting the at least one reactor to the remaining plurality of reactors at a new location to form a second flow path of the hydrocarbon stream through the plurality of reactors, wherein the low activity reactor is the first reactor in the second flow path wherein the low activity reactor comprises a catalyst with the lowest activity of the plurality of reactors in the second flow path, and wherein the at least one reactor is not adjacent to the second reactor in the second flow path;
resuming operations of the reforming reactor system to convert at least the portion of the hydrocarbon stream to aromatic hydrocarbons; and
absorbing the sulfur in the hydrocarbon stream in the low activity reactor before passing the hydrocarbon stream to a downstream reactor.

26. The process of claim 25, further comprising:
feeding the hydrocarbon stream to the plurality of reactors at a new location after reconnecting the at least one reactor to the remaining plurality of reactors.

27. The process of claim 26, wherein feeding the hydrocarbon stream to the plurality of reactors at the new location comprises reconfiguring the flow of the hydrocarbon stream through the plurality of reactors.

28. The process of claim 25, further comprising:
feeding the hydrocarbon stream to a third reactor of the plurality of reactors prior to isolating the at least one reactor deemed to have the operational issue; and
feeding the hydrocarbon stream to the low activity reactor after returning the at least one reactor to the hydrocarbon stream, wherein the third reactor and the low activity reactor are different reactors.

29. The process of claim 1, wherein reconnecting the at least one reactor to the remaining plurality of reactors comprises at least one of:
returning the at least one reactor to the hydrocarbon stream by connecting the reactor to the remaining plurality of reactors as the last reactor in the flow path of the hydrocarbon stream flow.

30. The process of claim 1, wherein reconnecting the at least one reactor to the remaining plurality of reactors comprises:
reconfiguring the flow path of the hydrocarbon stream flow through the plurality of reactors to place a low activity reactor of the plurality of reactors closest to the inlet of the hydrocarbon stream, wherein the low activity reactor comprises a catalyst with the lowest activity of the plurality of reactors.

* * * * *